United States Patent [19]

Nock

[11] Patent Number: 6,144,967

[45] Date of Patent: Nov. 7, 2000

[54] OBJECT ORIENTED PROCESSING LOG ANALYSIS TOOL FRAMEWORK MECHANISM

[75] Inventor: Clifton Malcolm Nock, Rochester, Minn.

[73] Assignee: International Business Machines Corporation, Armonk, N.Y.

[21] Appl. No.: 08/591,893

[22] Filed: Jan. 25, 1996

[51] Int. Cl.[7] .................................................. G06F 17/30
[52] U.S. Cl. .............................. 707/103; 709/300; 717/1
[58] Field of Search ........................... 707/103; 395/680, 395/682, 701, 704, 500.38; 717/1–4; 709/300–302

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,287,447 | 2/1994 | Miller et al. | 395/157 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,608,720 | 3/1997 | Biegel et al. | 370/249 |
| 5,634,057 | 5/1997 | Dickinson | 395/683 |

OTHER PUBLICATIONS

*IBM Technical Disclosure Bulletin*, vol. 37, No. 7, Jul. 1994, pp. 145–146, Banda et al., "Exception Management Algorithm for Multi–Threaded Method Invocation".

*IBM Technical Disclosure Bullein*, vol. 37, No. 6B, Jun. 1994, pp. 553–556, Gest et al., "Portable Object–Oriented Event Manager".

*IBM Technical Disclosure Bulletin*, vol. 37, No. 12, Dec. 1994, pp. 19–20, Al–Karmi et al., "Events Set for Event Tracing in Distributed Object–Oriented Systems".

*IBM Technical Disclosure Bulletin*, vol. 37, No. 12, Dec. 1994, pp. 375–378, Acker et al., "Automatically Generating Formatted Documentation for Object–Oriented Class Libraries".

*IBM Technical Disclosure Bulletin*, vol. 37, No. 11, Nov. 1994, pp. 71–72, Behrs et al., "Device Support Framework to Support ISO DPA 10175 and POSIX 1387.4".

*IBM Technical Disclosure Bulletin*, Cavendish et al., Jun. 1991, "Object–Oriented Documentation Tool", pp. 50–51.

(List continued on next page.)

*Primary Examiner*—Maria N. Von Buhr
*Attorney, Agent, or Firm*—David A. Hall; Martin & Associates, L.L.C.; Derek P. Martin

[57] ABSTRACT

A framework for use with object oriented programming systems encapsulates the common attributes of log analysis tools and permits framework implementers to generate customized log analysis tools that share a common structure and organization but are extended only in attributes that are specific to a particular tool. The framework defines a Log object that represents the activity log that is to be analyzed and is responsible for dividing itself into multiple, smaller LogSection objects. Each of the LogSection objects represents a portion of the activity log from which some information can be gathered. The information in a LogSection object is further mapped onto LogEvent objects. Each LogSection object can be referenced by an Analyzer object that controls the analysis.

99 Claims, 17 Drawing Sheets

OTHER PUBLICATIONS

*IBM Technical Disclosure Bulletin*, Allard et al., Feb. 1990, "Object–Oriented Programming in C—the Linnaeus System", pp. 437–439.

*IBM Technical Disclosure Bulletin*, vol. 38, No. 1, Jan. 1995, pp. 411–414, J. Knapman "Generating Specific Server Programs in Distributed Object–Oriented Customer Information Control System".

*IBM Technical Disclosure Bulletin*, Baker et al., Oct. 1991, "Office Container Class", pp. 309–310.

*IBM Technical Disclosure Bulletin*, Cavendish et al., Jul. 1991, "Icon Pane Class", pp. 118–119.

*IBM Technical Disclosure Bulletin*, Baker et al., Jun. 1991, "Distribution List Class", p. 159.

*IBM Technical Disclosure Bulletin*, vol. 37, DeBinder et al., Feb. 1994, "Results Folder Framework", pp. 431–432.

*IBM Technical Disclosure Bulletin*, vol. 36, Coskun, N., Jun. 1993, "Persistent Framework Independent Record/Playback Framework", pp. 261–264.

*IBM Technical Disclosure Bulletin*, Baker et al., Oct. 1991, "Model View Schema", pp. 321–322.

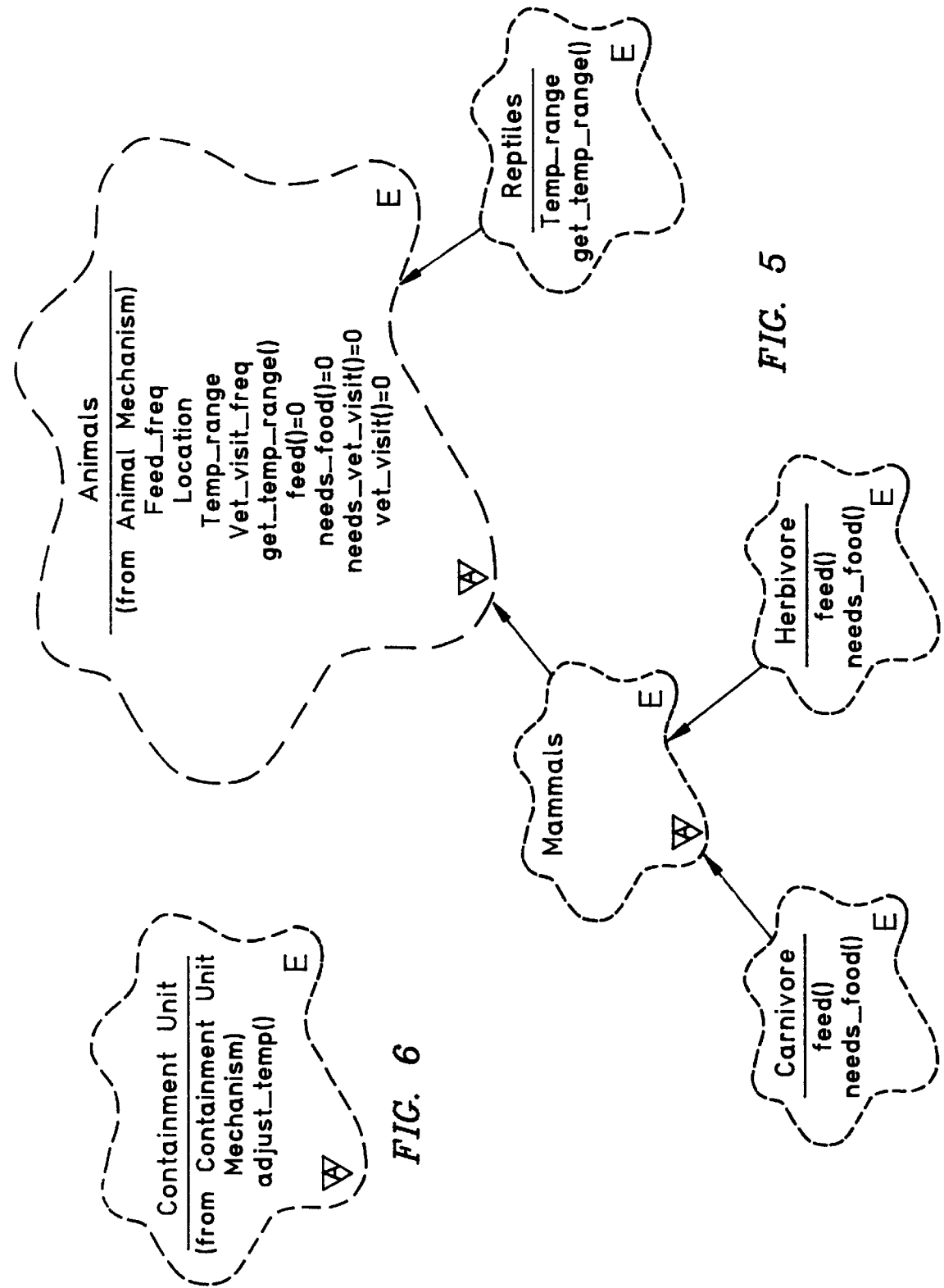

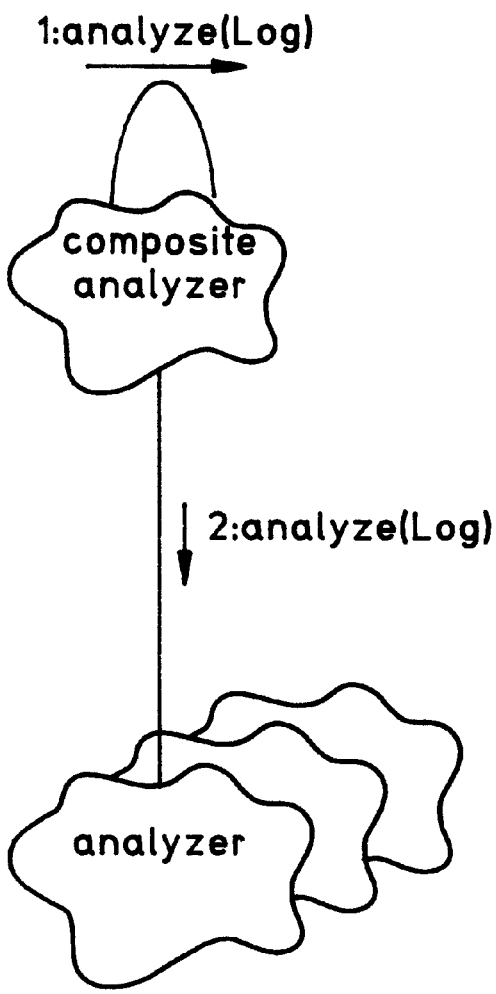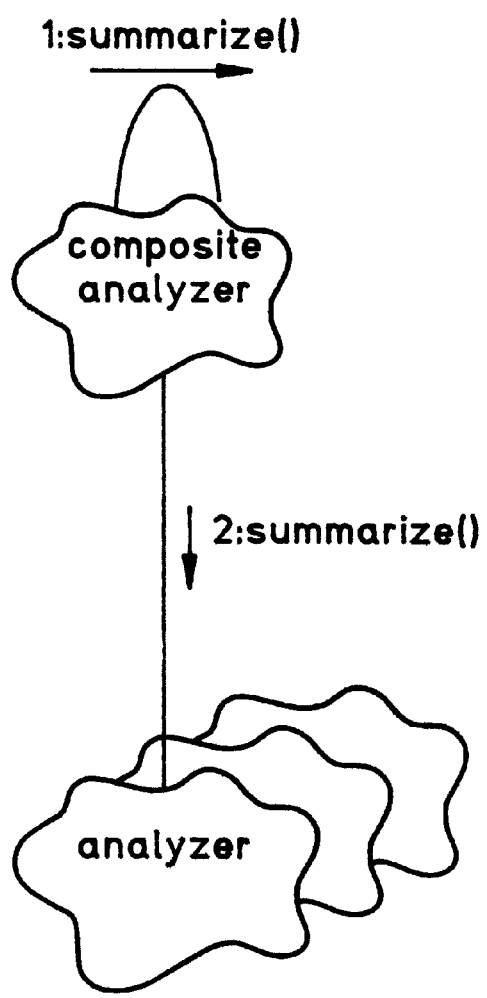
*FIG. 19*          *FIG. 20*

OBJECT ORIENTED PROCESSING LOG ANALYSIS TOOL FRAMEWORK MECHANISM

BACKGROUND OF THE INVENTION

1. Field of the Invention

The present invention relates generally to data processing and, more specifically, to object-oriented programming systems and processes.

2. Description of the Related Art

Many computer systems automatically create a record of the sequence of events that are carried out with respect to creating or modifying source files or collections of data. The recorded sequence of events is commonly referred to as a processing log or activity log. For example, a software program build system compiles or assembles large groups of source programs in a "build" procedure that creates an executable application program or operating system. Each source program that is processed must be specified, along with processing parameters and output locations. The entire build procedure, with source programs retrieved, action taken, and results obtained, might be recorded in an activity log for later analysis and trouble-shooting. The trouble-shooting could involve noting compilation errors and taking appropriate action.

Another example of recording events in a log is that of a file server system, which might service a plurality of users that request access to copies of data files. Responding to the requests for copies is seen by the system as a sequence of computer events that can be recorded in an activity log for later analysis. Another activity log example is that of a data base manager, which fields search query requests concerning a data base from multiple users and returns data fitting the query requests. The requests and even the responses comprise a sequence of events. A commercial order-filling or banking system creates an activity log as it receives orders or account changes and operates on them in a transactional, or atomic work order fashion.

In each of these instances, an activity log is kept because it might be necessary to trace the sequence of events performed by the computer system. This is useful, for example, in recovering from a system malfunction or equipment failure. The activity logs, however, are not typically recorded in an easily readable manner. Much of the information is coded and relatively cryptic. That is, processing errors are not readily apparent from viewing the log and significant events can be easily missed. As a result, many log analysis tools have been developed to facilitate review and analysis of activity logs. For example, many program build tools have associated log scanners that summarize a build procedure and/or send notifications to program developers who are responsible for acting on compile time failures and the like. Another example of log analysis tools are "watch-dog" programs that check the activity logs of server processes and send a notification when a server failure is detected.

Many log analysis tools share common construction design and features. Nevertheless, such tools are typically written for a specific purpose and function. That is, most log analysis tools are developed for an activity log of a particular format with particular messages or events recorded in a constant pattern. Because of this, minor changes in the format of an activity log typically result in substantial changes to the log analysis tool. As changes to the log analysis tool accumulate, the tools can become very difficult to maintain and debug. Much commonality from one tool to another can become lost. This makes upkeep of log analysis tools and development of new tools more difficult.

From the discussion above, it should be apparent that there is a need for a system and method for developing log analysis tools that permits more rapid development and easier maintenance. The present invention satisfies this need.

SUMMARY OF THE INVENTION

In accordance with the present invention, a reusable object oriented (OO) framework for use with object oriented programming systems encapsulates common attributes needed by log analysis tools. The OO framework can be easily extended by framework implementers to generate log analysis tools that share a common structure and organization but are customized, or extended, only in attributes that are specific to the particular tool such that particular types of activity logs can be analyzed. In this way, the basic framework code can be maintained in one place and a wide variety of log analysis tools can be implemented by reusing the common design defined by the OO framework.

The processing log analysis framework uses a set of interacting classes of objects to define the common design. The framework defines a Log object that represents the activity log that is to be analyzed and is responsible for dividing itself into multiple, smaller LogSection objects. Each of the LogSection objects represents a portion of the activity log from which some information can be gathered. The information in a LogSection object is further mapped onto LogEvent objects. Each LogSection object can be referenced by an Analyzer object that controls the analysis. When the Analyzer object completes its analysis, it produces a summary report and calculates desired statistics that reflect the information contained in the activity log.

In one aspect of the invention, a CompositeAnalyzer object can be defined so that it comprises a plurality of Analyzer objects chained together. Each LogEvent object can be analyzed by the chained Analyzer objects during the same processing traversal of the Log object. In this way, a CompositeAnalyzer can perform multiple analyses on an activity log, using different analysis tools, in a single traversal of the activity log represented by a Log object.

Other features and advantages of the present invention should be apparent from the following description of the preferred embodiment, which illustrates, by way of example, the principles of the invention.

BRIEF DESCRIPTION OF THE DRAWINGS

FIGS. 2, 3, 4, 5, and 6 are class diagrams for the exemplary Zoo Administration framework of FIG. 1.

FIG. 19 is a scenario diagram representation of the processing steps executed by the host processor illustrated in FIG. 8 when log analysis is performed using a composite analyzer.

FIG. 20 is a scenario diagram representation of the processing steps executed by the host processor illustrated in FIG. 8 when an analysis summary is performed using a composite analyzer.

DESCRIPTION OF THE PREFERRED EMBODIMENT

Overview—Object Oriented Technology

Figure 1:
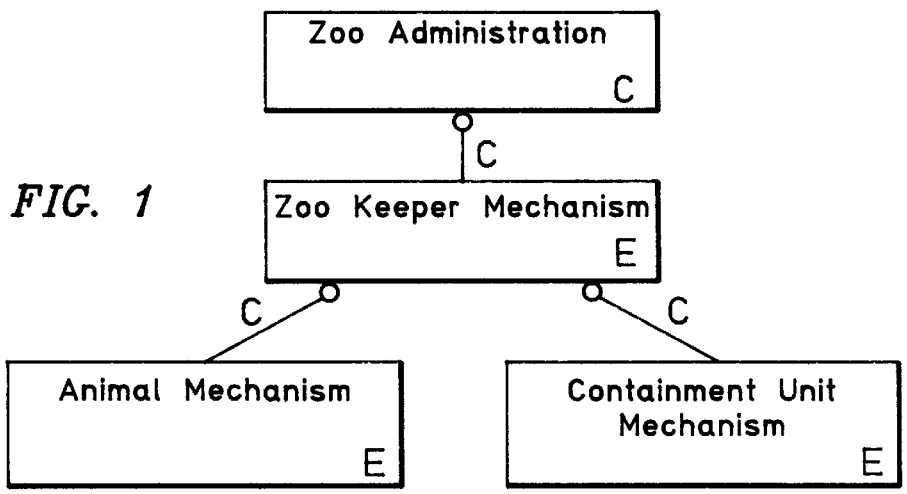
FIG. 1 is a category diagram of an exemplary Zoo Administration framework that illustrates the principles implemented by the system of the present invention.

As discussed in the Summary section, the present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the loosest definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/extension quality of frameworks is extremely valuable to purchasers (referred to herein as framework consumers) because the cost of customizing or extending a framework is much less than the cost of a replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a "using" relationship with the zoo keeper mechanism. (Again, please refer to the notation section of this specification for an explanation of this relationship and the other notation used in this specification.)

As discussed above, the zoo administration mechanism has been designed to have responsibility for overall control of ZAF. Accordingly, the zoo administration mechanism is responsible for scheduling the operation of the zoo keeper mechanism. Note also that the framework designer has designed the zoo administration mechanism to be a core function of ZAF, which means that it has been designed such that it will not be subject to potential customization and extension. The upper case block letter "C" in the category box for the zoo administration mechanism denotes this fact. Note further that the "uses" relationship between the zoo administration mechanism and the zoo keeper mechanism also has been designed as a core function such that it is not available for ultimate customization by the framework consumer.

The zoo keeper mechanism has been designed to be generally responsible for the care and feeding of the zoo animals. Accordingly, it uses the animal and containment unit mechanisms to perform its tasks. Unlike the design of the zoo administration mechanism, however, the framework designer has designed the zoo keeper mechanism to be an extensible function, which again means that the zoo keeper mechanism has been designed to be available for modification and/or extension by the framework consumer to address future care and feeding requirements. This fact is denoted by the upper case block letter "E" in the zoo keeper mechanism category box.

The framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible functions, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
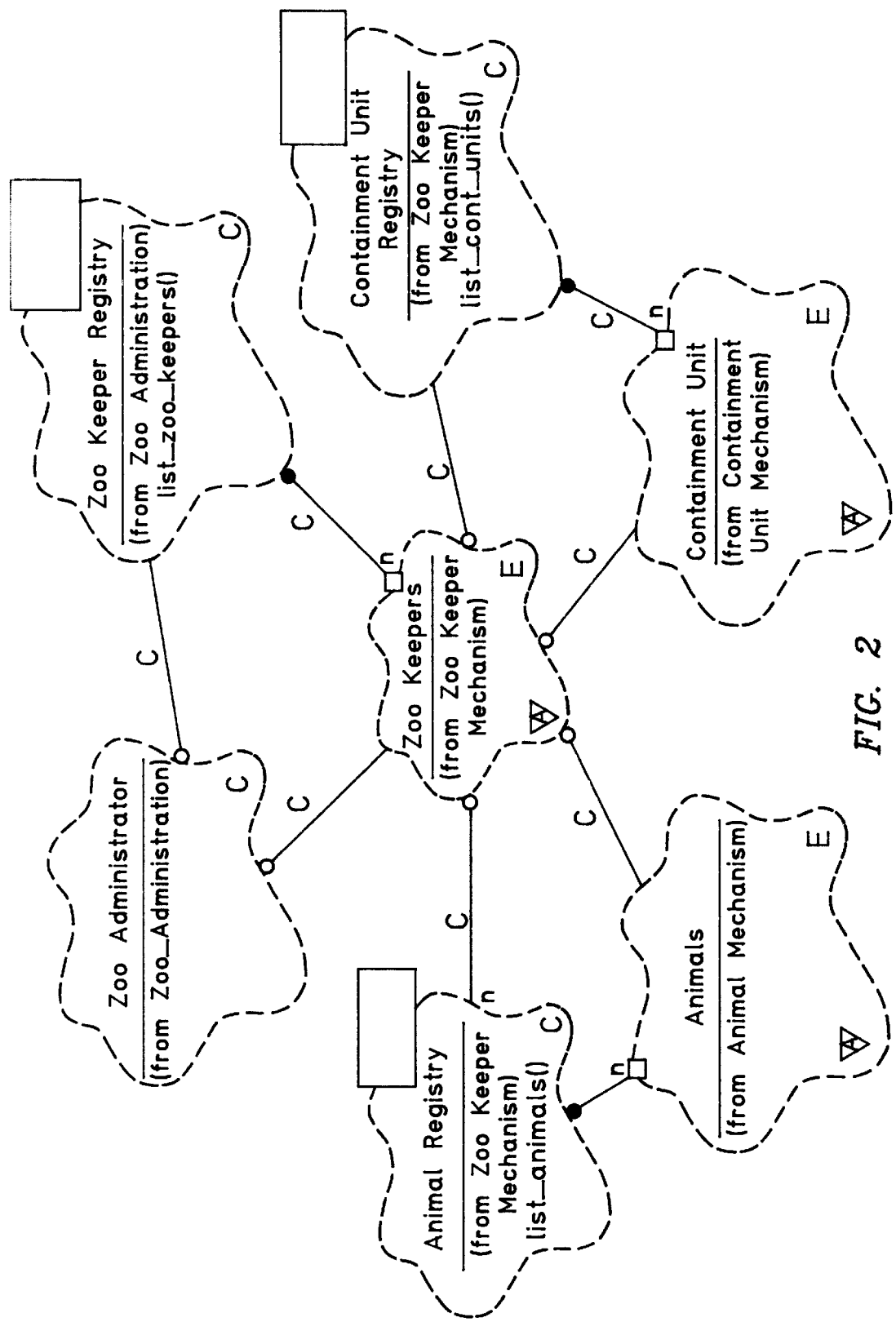

FIG. 2 is an OO class diagram that shows the fundamental classes that the framework designer has designed for ZAF. Each class representation indicates its relationship to the mechanisms shown on FIG. 1. For example, the zoo keepers class is denoted as being from the Zoo Keeper mechanism.

The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism. It should be noted that the relationships between the classes have been designed as core functions of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The zoo administration class has been designed to have a "uses" relationship with the zoo keeper registry. The framework designer has designed the zoo administration and zoo registry classes to be a core function of ZAF because the designer has decided that ZAF's consumers should not be allowed to modify the behavior of objects that are members of these class definitions. The zoo keeper registry, which has what is called a "contains by reference" relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
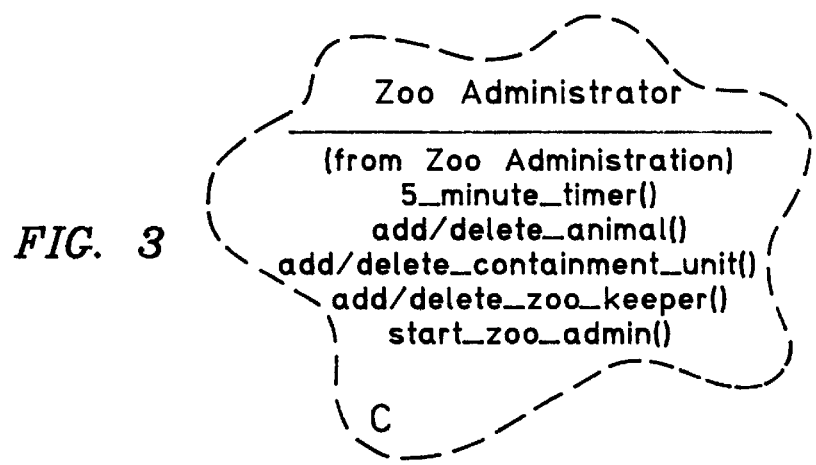

FIG. 3 shows a lower level view of the zoo administrator class. Because objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_ admin( ).

The start_zoo_admin( ) operation is responsible for starting ZAF. That is, a user or system administrator will interact with the start_zoo_admin( ) operation to begin administration of a zoo via ZAF. The start_zoo_admin( ) operation has been designed to initiate the 5_minute_timer( ) operation such that, every five minutes, the 5_minute_timer( ) operation instructs the zoo keeper objects to go out and check on the zoo animals. The add/delete_zoo_keeper( ) operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. The ZAF framework designer has provided this flexibility by designing the zoo keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, the framework designer has provided such flexibility by designing the animal and containment unit mechanisms as extensible functions.

Referring back to FIG. 2, the zoo keepers class definition has a "uses" relationship with the animal registry, animals, containment unit registry, and containment units classes. Since the value of ZAF is enhanced by allowing ZAF's consumers to customize and extend the zoo keepers, animals, and containment unit classes, the ZAF framework designer has designed these classes as extensible functions. However, changing the behavior of the animal and containment unit registry classes would disrupt the basic operation of ZAF. Therefore, the framework designer has designed these classes to be core functions of ZAF.

Figure 4:
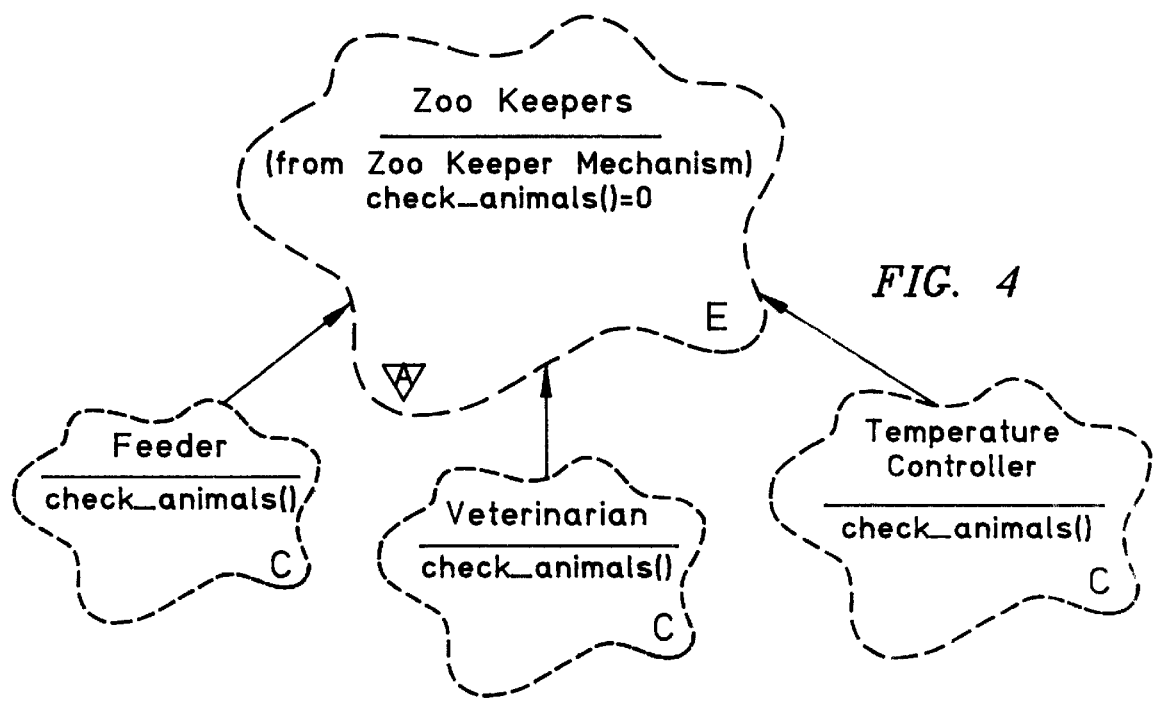

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e.; on the part of the zoo administrator object)

from the way in which the action is carried out (i.e., by one of the objects of the zoo keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

As previously discussed, the framework designer has designed the ZAF framework such that zoo keeper objects interact with animal and containment unit objects to perform their respective tasks. FIG. 5 is a class diagram for the class hierarchy of the abstract class animal. Because the animal class definition is responsible for representing the characteristics and behavior of zoo animals, the framework designer has designed the abstract class animal in a way that reflects this responsibility. As shown, the example class definition for animal includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extent the default operations by redefinition. Redefinition of a default operation is called overriding the default operation.

Mammals is a subclass of the class animals and, as such, the mammals class inherits all of the characteristics of the animals class. The mammals class is also designed as an abstract class, which again means that it has not been designed to have objects created as its members, but has instead been designed to provide a common interface for its subclasses. Subclass mammal is further subclassed into classes carnivore and herbivore.

Because definition of the feed( ) operation has been left up to the subclasses, the subclasses carnivore and herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
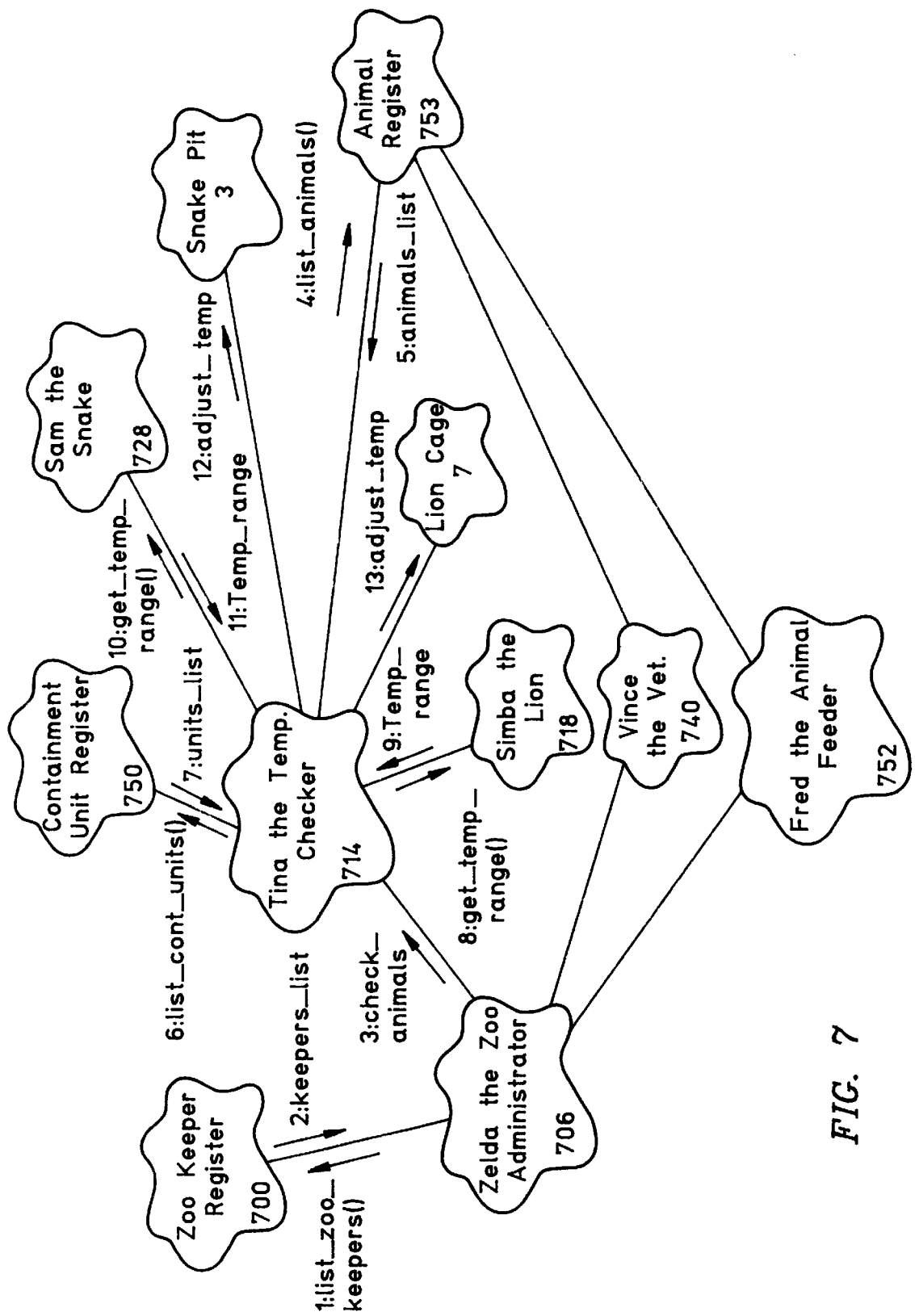
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_ keepers( ) operation [step 1] of the Zoo Keeper Register object. The Zoo Keeper Register object 700 has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda 706, object Zelda instructs each zoo keeper in the list to check the animals by calling the check_animals( ) operation of each zoo keeper object. Only the call to Tina the Temp. Checker is shown, indicated as step 3. It should be noted that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_ animals( ) operation of object Tina determines which containment units house the respective animals (i.e., Simba and Sam) and In then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

DETAILED DESCRIPTION OF THE PREFERRED EMBODIMENT

Figure 8:
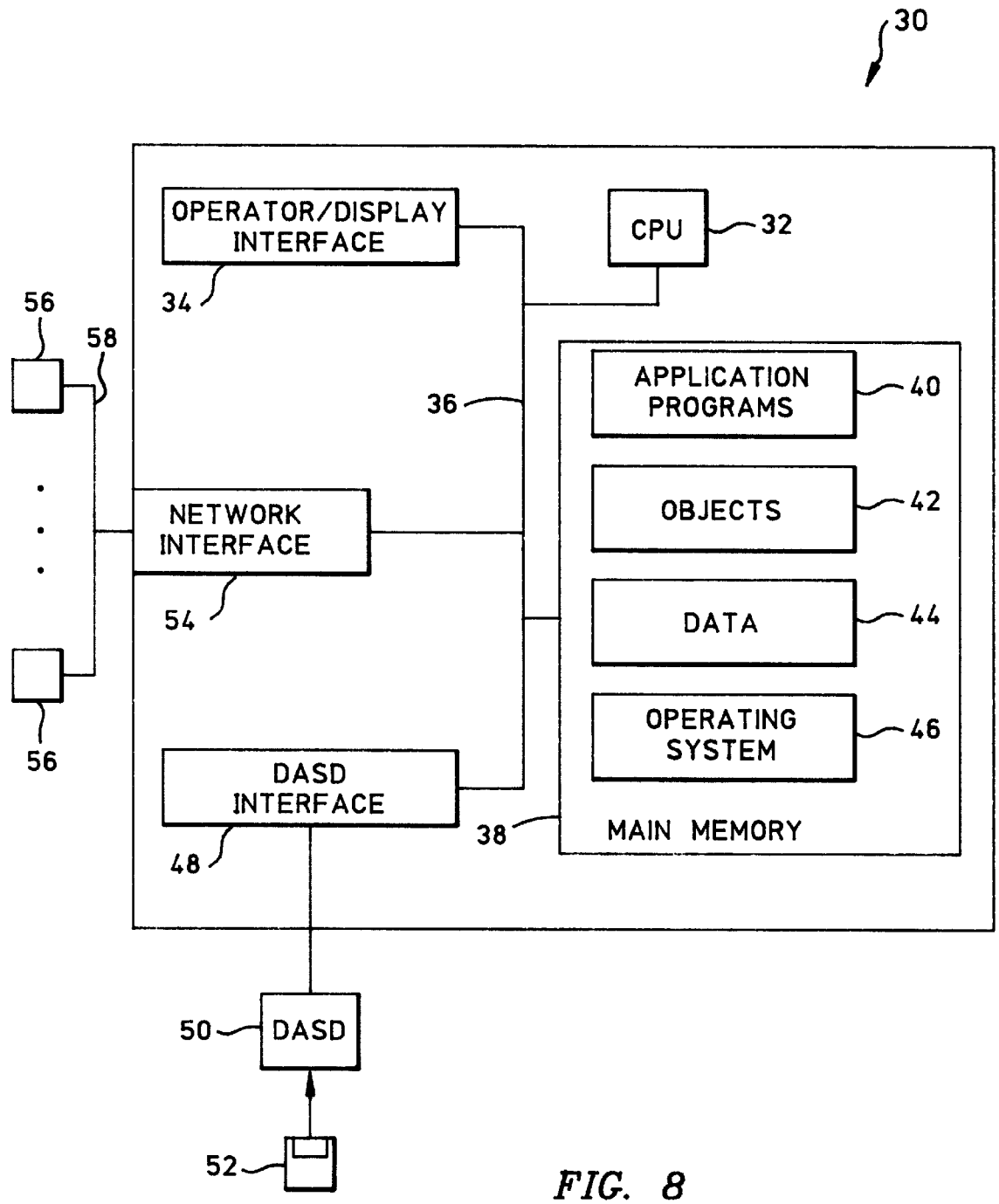
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

Figure 9:
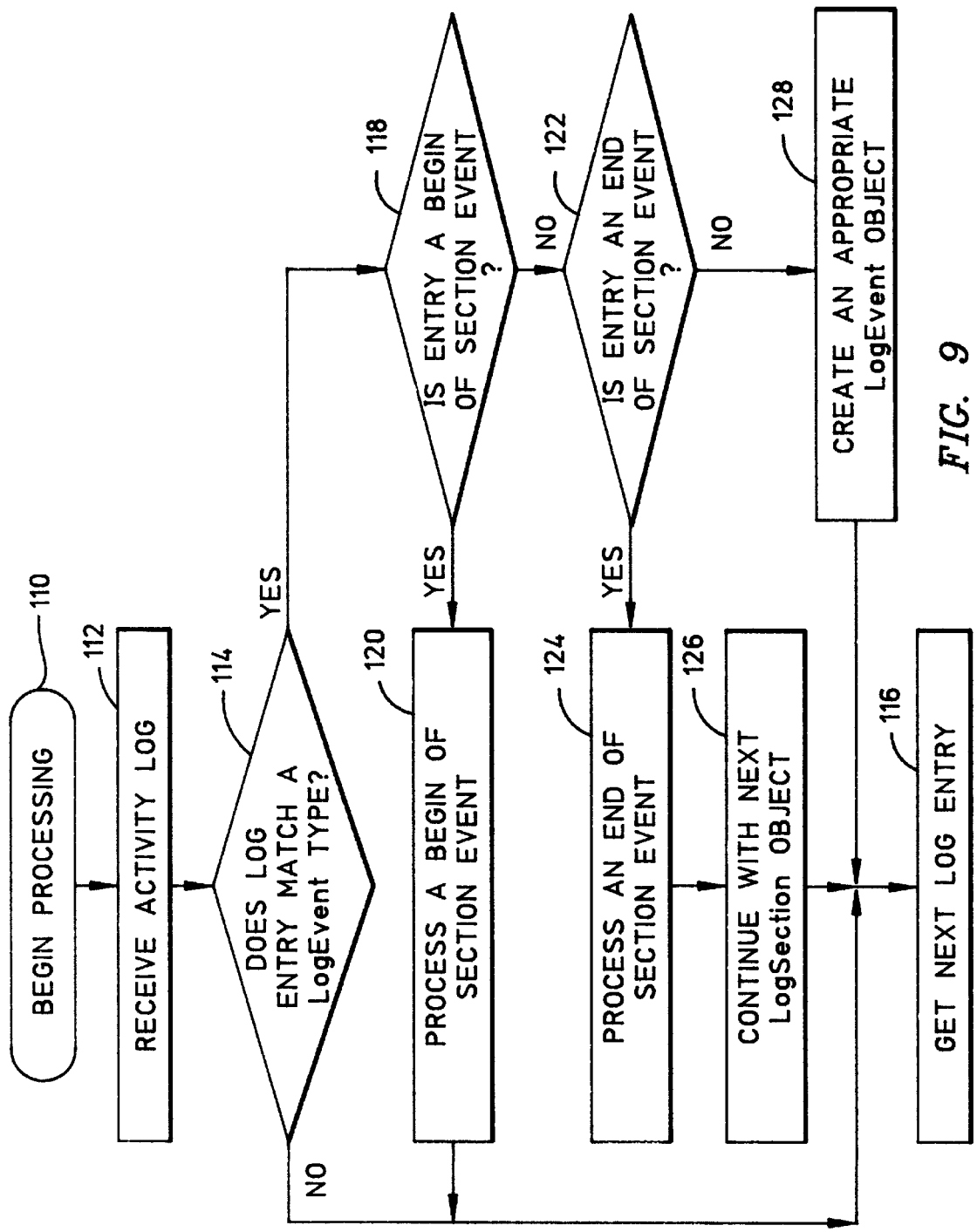
FIG. 9 is a flow diagram that illustrates the log mapping processing steps performed by the framework mechanism of the computer processing system illustrated in FIG. 8.

FIG. 9 is a flow diagram that represents the processing steps executed by the computer system illustrated in FIG. 8 in performing a log analysis process. The first step is for the framework user to decide upon the particular extensions needed for the desired log analysis operations, including the object attributes and behaviors. The framework extension is performed by a user in a manner dependent on the particular computer system on which the framework is received. Such processing is represented in FIG. 9 by the flow diagram box numbered 110 and labelled "begin processing". The begin processing step could be initiated in response to user input at the keyboard device. Once the framework is extended, log analysis involves execution of the extended framework by receiving the activity log itself, such as retrieving a log from memory or other data storage. This processing step is represented by the flow diagram box numbered 112. The activity log is received as a Log object. For purposes of the following discussion, the log being analyzed will be referred to as an activity log and the messages or lines that make up the log will be referred to as entries.

After the activity log is received and the Log object is created, the Log object has responsibility for parsing itself into LogEvent objects contained within different LogSection objects. That is, the activity log to be analyzed must be mapped onto the object inheritance structure extended from the framework. This processing is performed by the remaining processing steps illustrated in FIG. 9. For each entry in the activity log, the extended framework determines if the log entry matches one of the LogEvent types defined by the framework implementer. This determination step is represented in FIG. 9 by the decision box numbered 114. If the log entry does not match any LogEvent type known to the system, a negative outcome at the decision box, then processing continues with examination of the next log entry, which is represented by the flow diagram box numbered 116. When the next log entry is obtained, the LogEvent matching step of box 114 is repeated.

If the activity log entry matches one of the LogEvent object types, an affirmative outcome at the decision box numbered 114, then at the decision box numbered 118 the extended framework next checks to determine if the log entry corresponds to a "begin of section" event. If the log entry corresponds to a LogEvent object defined by the framework implementer to represent a new section of the activity log, then a new LogSection object is created. The framework implementer decides upon the parameters for a new LogSection based upon the need for gathering statistics and the type of logs to be analyzed. For example, a compiler might generate a particular kind of "compile start" log entry when it is about to begin compilation of a new source file and will generate a new set of compile time statistics associated with that file. The framework implementer of a log analysis tool would likely define such a "compile start" entry to be a "begin of section" LogEvent. If the LogEvent type indicates that a new section should be marked, then a "begin of section" processing step is performed, as indicated by the flow diagram box numbered 120. In the begin of section processing step, the Log object updates its list of LogSection objects (because implicitly one LogSection was just completed) and creates a new LogSection object. Processing of the activity log then continues with the next log entry at box 116.

If the log entry is not a begin of section event, a negative outcome at the decision box numbered 118, then processing proceeds to the decision box numbered 122, where the system checks to determine if the log entry corresponds to the end of a log section. Again, the framework implementer decides upon the entries that comprise the boundaries of a log section based on the statistics desired and the logs to be analyzed. If the LogEvent type indicates that an end of a log section should be marked, then an "end of section" processing step (involving creation of an "end" kind of LogEvent object) is performed, as indicated by the flow diagram box numbered 124. After the appropriate LogEvent object is created, processing continues with any other appropriate processing desired and the parsing process is continued with the next entry, which should comprise the first entry in the next section of the activity log, as indicated by the flow diagram box numbered 126.

If the log entry matched at the decision box numbered 114 was not either a "begin section" event or an "end section" event, then the extended framework matches the log entry to one of the other LogEvent types known to it. This is indicated by the flow diagram box numbered 128, which indicates creation of an appropriate type of LogEvent object. In the preferred embodiment, matching log entries to LogEvent object types incorporates error checking. For example, if a "new section" entry is located in the log before an "end of section" entry has been located for the prior log section, then a framework implementer might decide that an appropriate "error" type of LogEvent object should be created.

The framework implementer should define appropriate "error" types of LogEvent objects based on the log being analyzed. For example, if a second "compile start" entry is found with no intervening "compile end" entry, then it can be concluded that the first compilation process terminated improperly and an appropriate error LogEvent object should be created. Other types of logs might permit nesting of LogSection objects and therefore would require different error LogEvent types and processing. The "error" LogEvent objects would be processed, along with the other LogEvent objects, during the analyze operation described further below. The error LogEvent object creation is only one of the types of operations defined by a framework implementer in conjunction with extending the framework and is included within the operation of the flow diagram box numbered 128. Therefore, the framework implementer should define LogEvent objects according to a set of predetermined actions that must take place in response to log entries, including handling of operational errors that were detected by the processes that created the log (and that were properly embedded in the log) and errors in the activity log itself.

After the log entry has been mapped onto one of the LogEvent object types by the creation of the appropriate LogEvent object at one of the flow diagram boxes numbered 118, 122, or 128, the system processing continues with examination of the next entry in the activity log at the flow diagram box numbered 116. As noted above, the LogEvent matching indicated at the decision box numbered 114 is repeated for the next log entry. In this way, all log entries are serially compared against the defined LogEvent types. Once all the activity log entries have been compared against the set of LogEvent object types, the parsing of the 10 activity log is complete. The system can then move into the log analysis stage of processing, which is illustrated in the flow diagram of FIG. 10.

Figure 10:
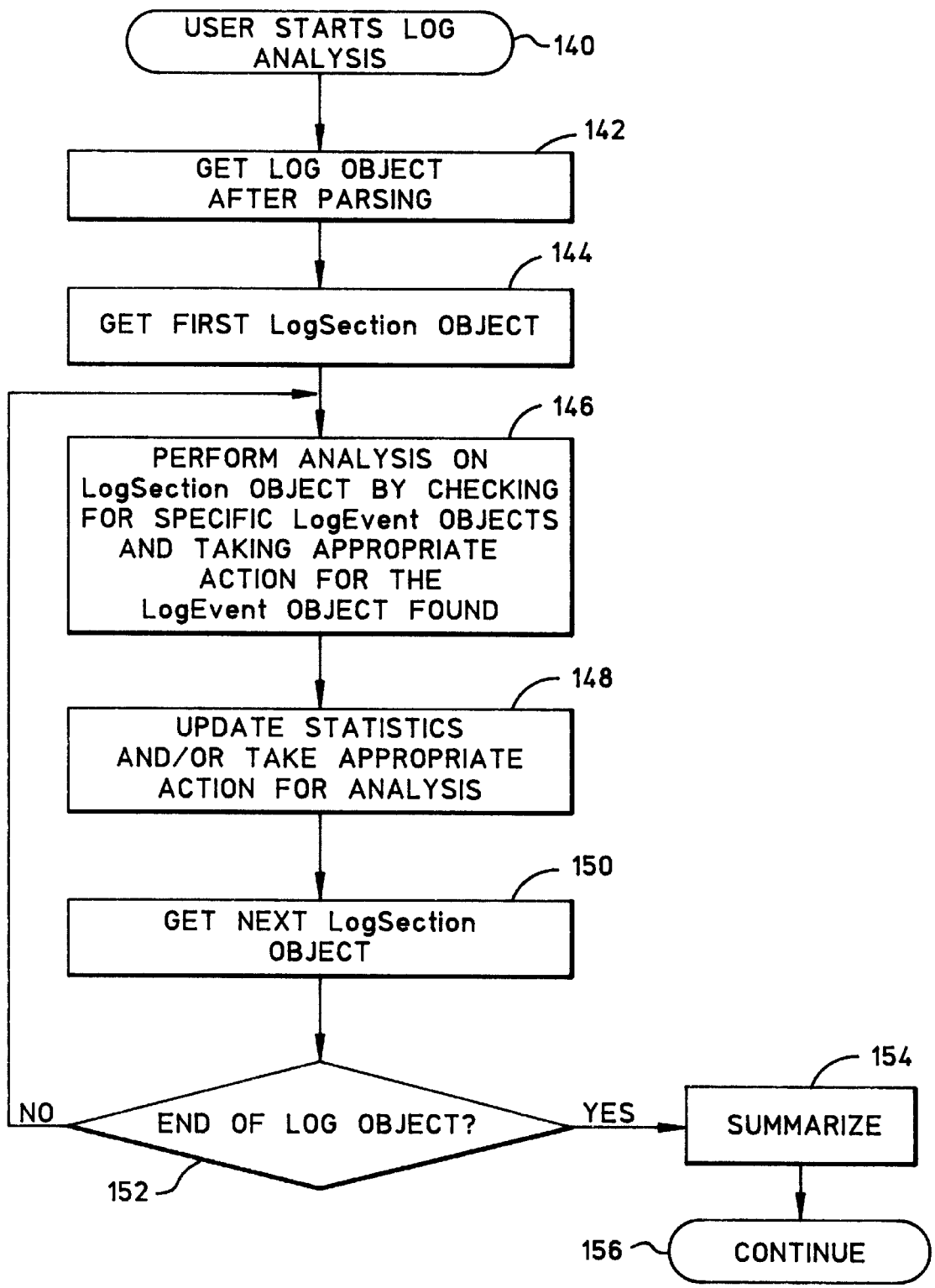
FIG. 10 is a flow diagram that illustrates the log analysis processing steps performed by the framework mechanism of the computer processing system illustrated in FIG. 8.

The log analysis process using the extended framework is started by the user after the log parsing is completed using the operator/display interface according to the computer system on which the framework extension is implemented, as indicated by the FIG. 10 flow diagram box numbered 140. The first step is to retrieve the Log object created by the parsing, represented by the flow diagram box numbered 142. The first LogSection object contained in the Log object is examined, as indicated by the flow diagram box numbered 144. A LogSection analysis processing step is performed next, defined by the attributes and behaviors of the analyzer objects decided upon by the framework implementer. This processing step is represented by the flow diagram box numbered 146. As noted in FIG. 10, LogSection analysis is performed by checking for specific LogEvent objects and taking appropriate action based on the LogEvent objects found. The action taken in response to the LogEvent object found can take many forms, as decided by the implementer. Analysis processing can include, for example, producing raw data for later analysis or creating another type of LogEvent object.

Part of the log analysis operation includes accumulating analysis statistics and taking other appropriate action, as indicated by box 148. Statistics collected might include the number of each LogEvent object type encountered, the frequency distribution of LogEvent object types per unit time covered by the activity log, and the like. An appropriate action in response to the analyzed LogEvent object might comprise sending an error message to an operator if a particular LogEvent object is encountered. For example, the framework implementer might decide to check if a compile-error event occurred and, if so, send an e-mail message to an appropriate person for attention. Such analysis processing is represented in FIG. 10 by the flow diagram box numbered 148.

After appropriate processing for the LogEvent object has been carried out, the next LogEvent object is retrieved from the LogEvent objects contained in the Log object being analyzed. This retrieval step is represented by the flow diagram box numbered 150. With the next LogEvent object, the system checks to determine if an end of section has been encountered at the decision box numbered 152. If an end of section has been encountered, an affirmative outcome at the decision box, then a summarize operation is carried out. This includes calculating appropriate statistics such as are calculated at the end of a population sample, taking needed operator message processing steps, and the like, as represented by the flow diagram box numbered 154. Other system processing can then be continued, as represented by the continuation box numbered 156. If the next LogEvent object is not an end of section event, then the system carries out the appropriate processing for the LogEvent object, as indicated by the return of processing to the flow diagram box numbered 146.

As described further below in conjunction with the category diagrams and scenario diagrams, composite log analyzer tools can be used to compare an activity log against multiple sets of LogEvent types. In this way, multiple log analysis tools can be used against an activity log in a single pass through the Log object. In that case, the steps represented by FIG. 10 would be repeated for each set of corresponding LogEvent types.

Figure 11:
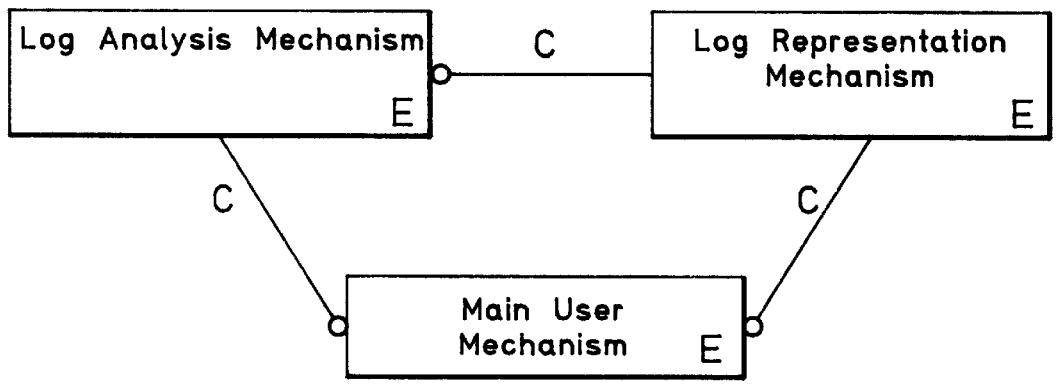
FIG. 11 is a category diagram representation of the framework mechanism of the computer processing system illustrated in FIG. 8.

FIG. 11 is a category diagram for the framework implemented in the computer system of FIG. 8. Those skilled in the art will appreciate that the categories illustrated in FIG. 10 represent collections of object oriented programming (OOP) objects that encapsulate data attributes and behaviors and are stored in the main memory illustrated in the block diagram of FIG. 8. Such objects can be implemented, for example, in a computer system operating environment that supports the C++ programming language.

The FIG. 11 category diagram representation of the framework shows three primary components, or mechanisms, comprising a Main User Mechanism, a Log Analysis Mechanism, and a Log Representation Mechanism. The Main User Mechanism is the mechanism that initiates a log analysis procedure following the extension of the basic framework so as to generate a log analysis tool. This mechanism can be simply a user interface through which a framework user initiates processing and communicates with the computer system. It can comprise, for example, the operator/display interface illustrated in FIG. 8. Thus, the Main User Mechanism is not necessarily an object oriented category or class collection at all. The framework user decides what form the Main User Mechanism will take. Therefore, the Main User Mechanism is shown as an extensible class, indicated by the "E" adornment in its category box. In the preferred embodiment, all log processing procedures are initiated by an operator action through the operator/display interface.

The framework may be extended by a user through the same operator/display interface used to interact with the extended framework. Such user/application program system interfaces typically depend, for example, on the particular operating system executing on the computer system. The particular interface will be accommodated by the user in view of the user's operating system.

The Log Representation Mechanism shown in FIG. 11 represents the category of objects into which the activity log is placed. That is, the activity log being analyzed will be mapped onto a collection of objects having the structure, attributes, and behavior defined by the Log Representation Mechanism. The Log Representation Mechanism is responsible for comparing the events or entries identified in the activity log and mapping them onto the proper defined LogEvent object types to thereby create the Log object. This mechanism is indicated in FIG. 11 as being an extensible category, represented by the "E" adornment in the category box. As those skilled in the art will appreciate, this means that the framework implementer can define the particular attributes and behaviors of the objects making up the category, although the classes and their interrelationships cannot be changed.

The Log Analysis Mechanism is the mechanism that carries out a log analysis procedure. That is, the Log Analysis Mechanism is responsible for identifying the LogEvent object types in the Log object, collecting statistics concerning the log analysis procedure, performing actions according to the LogEvent objects located, and generating summary reports based on the outcome of the log analysis. This mechanism is indicated in FIG. 11 as being extensible because, as with the Log Representation Mechanism, the implementer of the framework can define the particular attributes and behaviors of the objects making up the category. Therefore, the Log Analysis Mechanism is shown in FIG. 11 with an "E" adornment in its category box.

The association relationships indicated by the connecting lines between the Main User Mechanism category box, the Log Analysis Mechanism category box, and the Log Representation Mechanism category box indicates that the relationship between the mechanisms is a "using" relationship. That is, the Log Analysis Mechanism has a client role to the supplier role of the Log Representation Mechanism and the Main User Mechanism uses the Log Representation Mechanism in starting the processing, then calls the Log Analysis Mechanism for a summary. The "C" adjacent the connecting lines indicates that the relationships are core relationships that cannot be changed by the framework implementer. Thus, the way in which the objects making up these mechanisms interact with the other objects is fixed by the framework provider and cannot be changed by the framework implementer. More particularly, the framework assumes that an activity log to be analyzed will be received and mapped onto a collection of objects and methods defined by the classes and objects of the Log Representation Mechanism, and that these objects will be processed by the objects and methods defined by the Log Analysis Mechanism.

Figure 12:
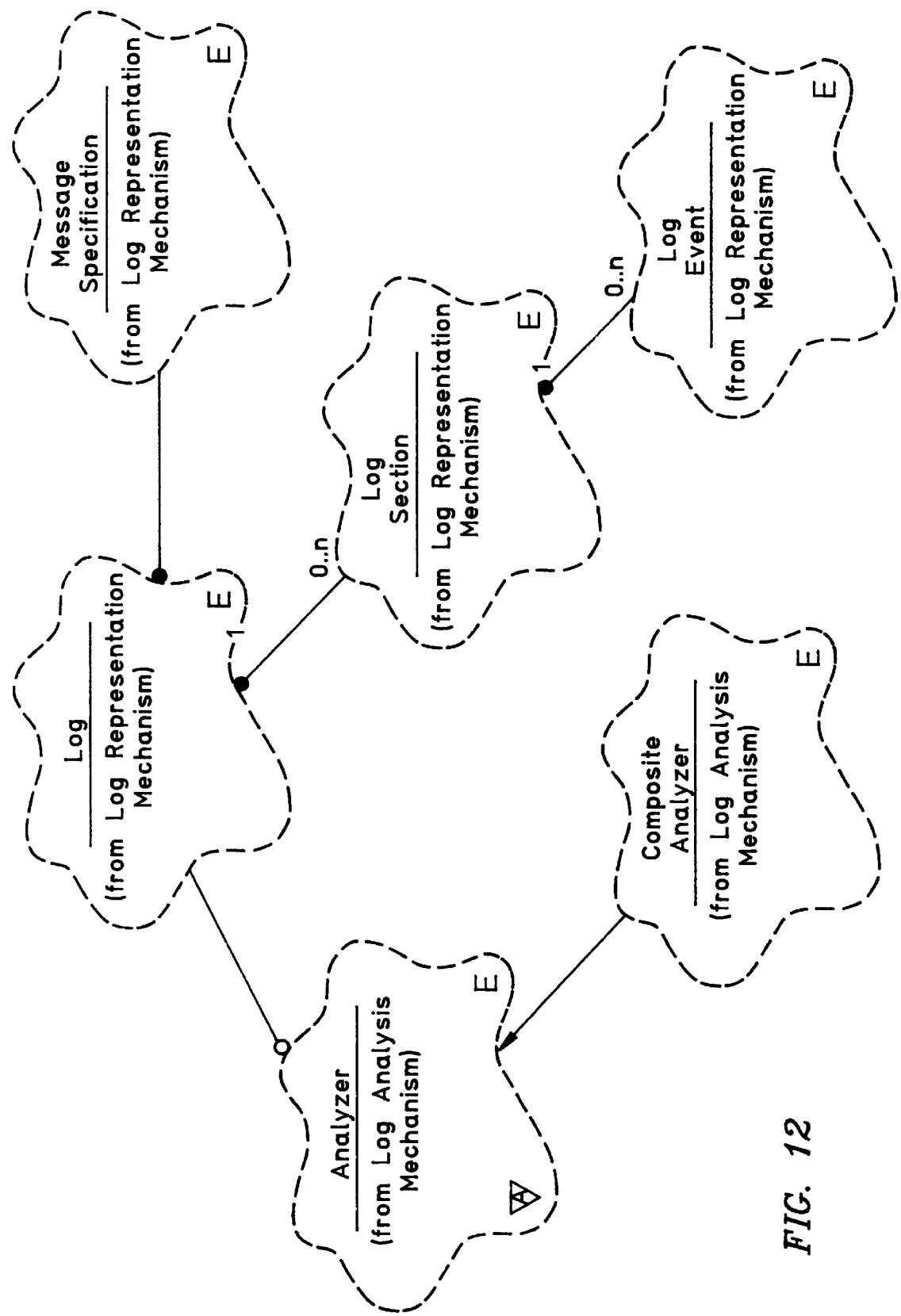
FIG. 12 is a class diagram representation of the Log Representation and Log Analysis mechanism categories implemented by the computer processing system illustrated in FIG. 8.

FIG. 12 is a class diagram that illustrates characteristics of the primary object classes of the framework. FIG. 12 indicates that the class Log is from the class category Log Representation Mechanism, meaning that the class Log belongs to the Log Representation Mechanism category. FIG. 12 shows the class Log with a "has" relationship to the class LogSection, which in turn is shown with a "has" relationship to the class LogEvent. Thus, FIG. 12 indicates that a Log object is a collection of zero to n LogSection objects, which are containers for zero to n LogEvent objects. A LogEvent object represents a specific entry, line, message, or the like in an activity log, whereas a LogSection object represents a section of the activity log comprising a group of entries. As noted above, the framework implementer determines the boundaries of the log sections. In particular, the LogSection objects contain a list of LogEvent objects that correspond to computer system events that occurred during the processing time covered by the LogSection.

As described above in conjunction with the flow diagram of FIG. 9, when an activity log is to be analyzed, the entries in the log are first mapped onto a predetermined set of event types defined by the LogEvent object class. It might not be possible or desirable for every entry in an activity log to correspond to or result in a LogEvent object or a process performed by the framework system. The determination of what activity log entries generate a LogEvent object is performed by the class MessageSpecification shown in FIG. 12. In FIG. 12, the class Log is shown with a "has" relationship to the class MessageSpecification. Thus, every Log object is associated with a MessageSpecification object, which is from the Log Representation Mechanism. In this way, a MessageSpecification object receives log entries from the Log object and maps the entries onto LogEvent objects for the type of activity log it handles. If an entry corresponds to a defined LogEvent object type, then the MessageSpecification object returns the appropriate LogEvent object. Thus, different types of Log objects will be associated with different types of MessageSpecification objects.

After the MessageSpecification object has parsed the activity log to be analyzed into appropriate LogEvent objects, the Analyzer object can perform its analysis on the Log object. Thus, FIG. 12 shows the class Log in a supplier role of a "using" relationship to the client role of the class Analyzer, which is from the category Log Analysis Mechanism. That is, the Analyzer class uses the Log object as input for the analysis process. An Analyzer object is responsible for gathering statistics and/or performing actions based on the LogSection objects and for summarizing the results.

FIG. 12 shows the Analyzer class with an inheritance relationship with the class CompositeAnalyzer. As described further below, the class CompositeAnalyzer is a collection of Analyzer objects. A CompositeAnalyzer object represents one or more Analyzer objects that are chained together. As each LogEvent object is encountered, the CompositeAnalyzer sends the object to each one of the Analyzer objects of which it is comprised. In this way, a CompositeAnalyzer object is a kind of Analyzer object that dispatches all LogEvent analysis operations to its composite members. This permits multiple, possibly unrelated, Analyzer objects to analyze the same Log object while making only one processing traversal through the object.

Figure 13:
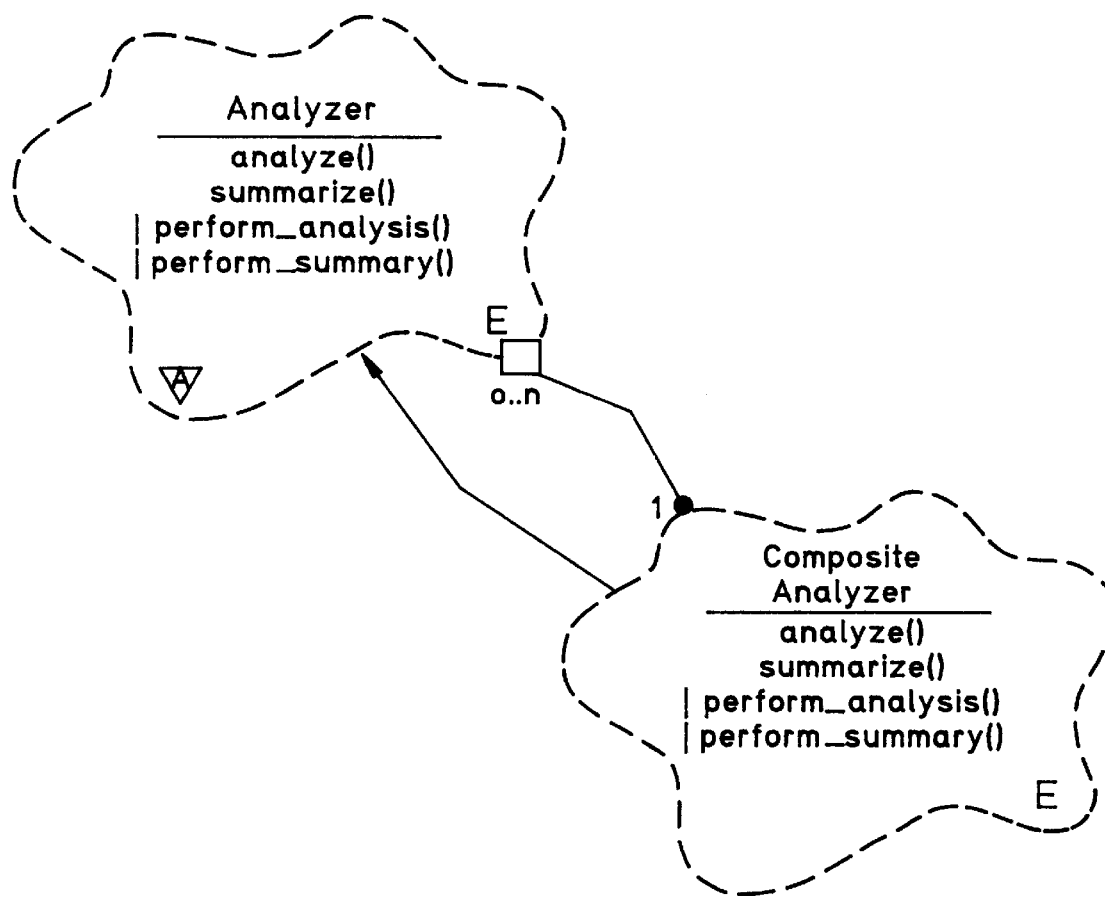
FIG. 13 is a class diagram representation of the Analyzer category implemented by the computer processing system illustrated in FIG. 8.

FIG. 13 shows the Analyzer and CompositeAnalyzer composition and relationship in greater detail. FIG. 13 is an example of a composite pattern. Such framework patterns are described, for example, in the book *Design Patterns: Elements of Reusable Object-Oriented Software*, Erich Gamma, et al. (1995), Addison-Wesley Publishing Co., Reading, Mass., U.S.A. FIG. 13 shows that the CompositeAnalyzer object inherits from the class of Analyzer, but also the CompositeAnalyzer has from zero to "n" Analyzer objects. That is, there may be no CompositeAnalyzer object in the extended framework, but if there is one, its operation is specified by the aggregation of Analyzer objects of which it is comprised. The class clouds for both of these classes are shown in FIG. 13 with an "E" adornment to indicate that they are extensible classes, meaning that the framework implementer defines the particular attributes and behaviors that comprise the statistic gathering and action performing of the Analyzer objects.

FIG. 13 also shows that the Analyzer and CompositeAnalyzer include two public (freely accessible) methods or operations, an analyze( ) operation and a summarize( ) operation. The analyze( ) operation gathers statistics and/or performs actions based on the LogSection objects that make up the given Log object being analyzed. The summarize( ) operation is called after the activity log analysis is complete and summarizes the analysis performed by the one or more calls to the analyze( ) operation. Again, the class cloud indicates that this class is extensible. Thus, the framework implementer decides what particular format the analysis summary will take.

FIG. 13 shows that each class also includes two other operations, one called perform_analysis( ) and one called perform_summary( ). These operation titles are shown with a leading vertical bar to indicate they are protected, meaning that these operations are called only from within their respective objects. The operations are used by the associated Analyzer object to perform analysis and summary processing, respectively, for the associated Analyzer object. Making these operations protected ensures that a framework user can define new Analyzer object types when extending the framework, but that the order of calling the analyze and summary operations will not be inadvertently changed by the framework user. This avoids having inappropriate analyses and reports generated.

Figure 14:
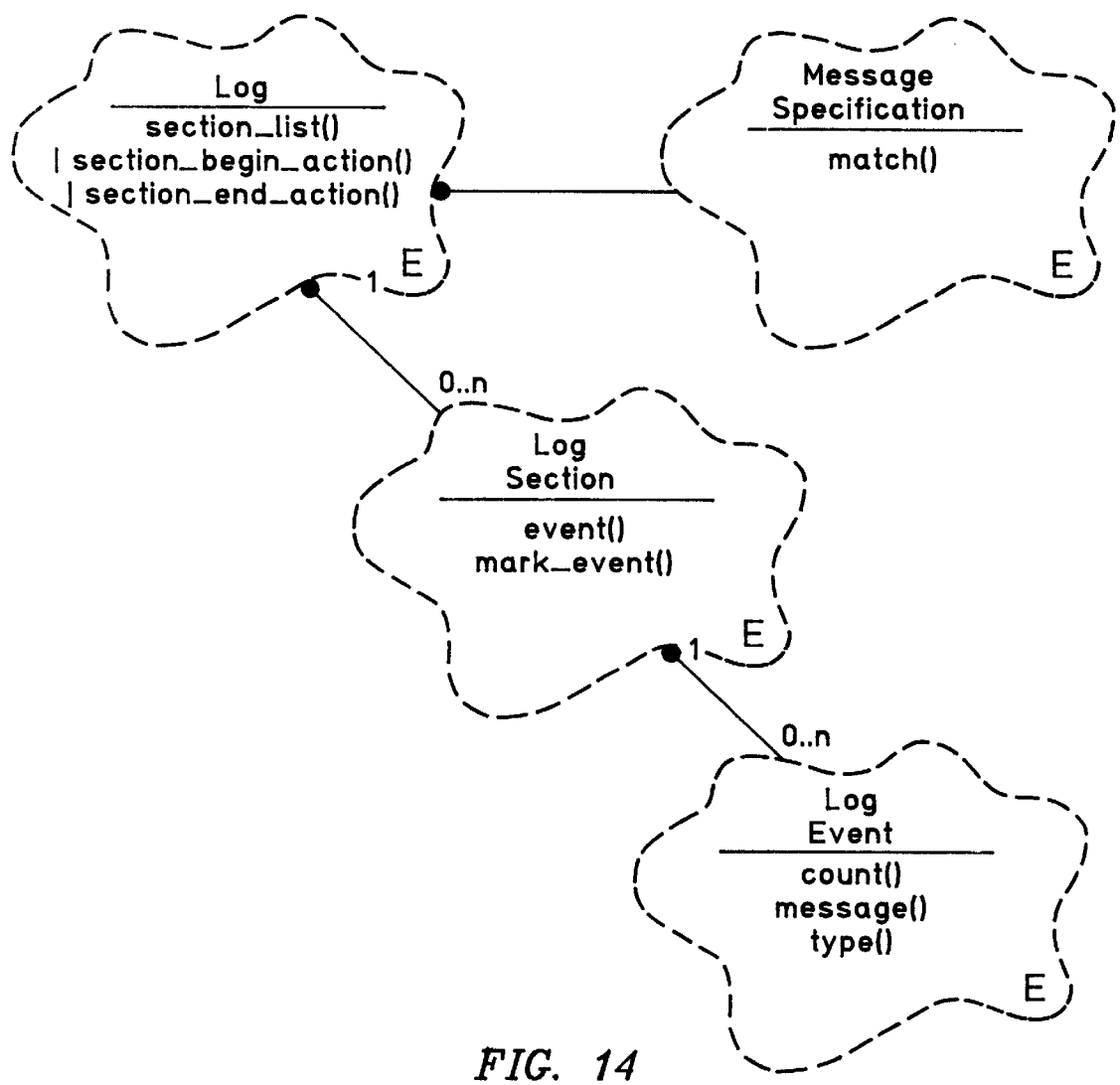
FIG. 14 is a class diagram representation of the Log category implemented by the computer processing system illustrated in FIG. 8.

FIG. 14 shows the Log class and related classes in greater detail. FIG. 14 shows that the MessageSpecification object includes an operation called match( ). The match( ) operation is the process by which the extended framework system maps activity log messages or entries to LogEvent objects. That is, the match( ) operation returns a LogEvent object if such an object corresponds to a given message or entry in the activity log. The class cloud for MessageSpecification has an "E" adornment to indicate that this class is extensible, so that its particular attributes and behaviors are defined by the framework implementer in accordance with the activity logs to be analyzed.

FIG. 14 shows that Log includes a public (accessible) operation called section_list( ) and two protected operations, one operation called section_begin_action( ) and one operation called section_end_action( ). The public section_list( ) operation is an operation that returns the list of LogSection objects that make up a Log object. The leading vertical bar at the section_begin_action( ) and section_end_action( ) operation titles indicate that these operations are protected, meaning that a client of Log class cannot call these operations. These operations are called from within the Log class, so that they are used by the Log object to begin processing and end processing, respectively, of a LogSection object. Making these operations protected ensures that a framework user can define new Log object types when extending the framework, but that the order of calling the new section operations and marking new LogSection objects will not be inadvertently changed by the framework user. That is, the "begin section" and "end section" operations should be called only by the Log object and not by other objects. Protecting them ensures that this will be so.

The LogSection object is shown in FIG. 14 as having two operations, one called event( ) and one called mark_event( ), that operate on the LogEvent objects. The mark_event( ) operation indicates if a log entry corresponding to a LogEvent object occurred during the time covered by the LogSection being analyzed. The event( ) operation returns the LogEvent of a given type, if one is found. The FIG. 14 class cloud for LogEvent shows that it has three operations, count( ), message( ), and type( ). The type( ) operation returns an event type indicator for the LogEvent object, the count( ) operation returns the number of times the LogEvent object type has occurred in the LogSection, and the message( ) operation returns the activity log message itself.

Figure 15:
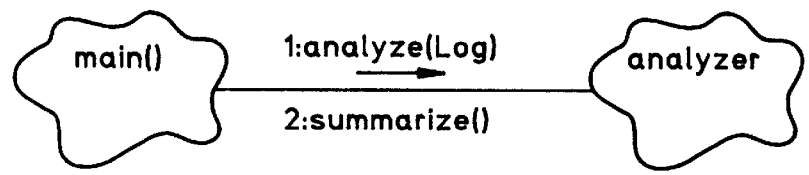
FIG. 15 is a scenario diagram representation of the processing steps executed by the host processor illustrated in FIG. 8 when instantiating a log analysis tool and analyzing an activity log.

The operating steps performed by the log analysis tool development system constructed in accordance with the invention will be better understood with reference to object-scenario diagrams, which those skilled in the art will understand show processing for an object oriented programming framework implementation. FIG. 15 is an object-scenario diagram for the framework implemented in the computer system illustrated in FIG. 8.

FIG. 15 is a scenario diagram that shows how a user (represented as the "main" object cloud) initiates an activity log analysis by instantiating an extension of the framework. After the framework is instantiated according to object oriented programming principles, the activity log is parsed into LogEvent objects and the user calls for analysis of the Log object. The FIG. 15 diagram represents a request to analyze a Log object, as indicated by the connecting line from the object cloud "main" to the object cloud "analyzer" with the arrow labelled "1: analyze(Log)". The arrow labelled "2: summarize(Log)" from "main" to "analyzer" indicates that a user requests a summarization after the analysis is complete.

The details of the main( ) operation call will be selected by the framework user. An exemplary list of C programming language statements that perform the requisite function for the general case is provided below (with explanatory comment) in Table 1:

TABLE 1

Sample main() operation.

```
int main (int argc, char *argv[])
{
    //Instantiate the MessageSpecification object.
    MessageSpecification messageSpec;
    //Instantiate the Log object.
    Log log (logFilename, messageSpec);
    //Instantiate the analyzer objects to be used.
    Analyzer analyzer1;
    Analyzer analyzer2;
    //Instantiate the composite analyzer.
    CompositeAnalyzer cAnalyzer;
    cAnalyzer.add (analyzer1);
    cAnalyzer.add (analyzer2);
    //Analyze the Log.
    cAnalyzer.analyze (log);
    //Summarize the Log.
    cAnalyzer.summarize();
}
```

Figure 16:
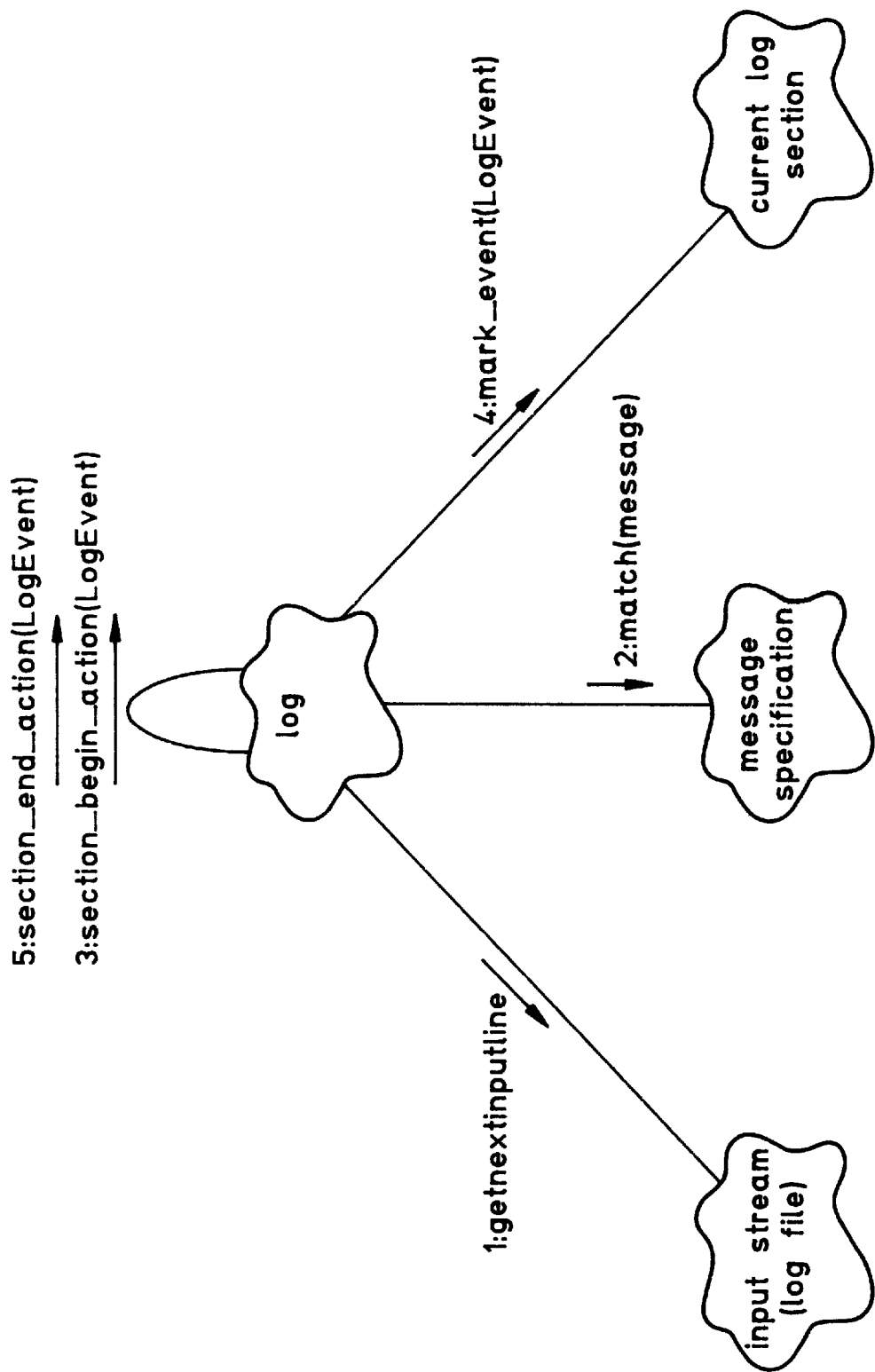
FIG. 16 is a scenario diagram representation of the processing steps executed by the host processor illustrated in FIG. 8 when an activity log is being mapped onto a set of LogEvent objects.

FIG. 16 shows the parsing of an activity log into a Log object having constituent LogSection objects and LogEvent objects. The processing begins with a Log object retrieving an activity log input stream. The size of the input stream is determined by the particular implementation constructed by the framework implementer and will depend, for example, on the operating specifications of the computer system on which the framework is installed.

The first processing step is represented in FIG. 16 by the connecting line labelled "1: get next input line" from the "log" object cloud to the "input stream (log file)" object cloud to indicate that the Log object operates on the activity log received as input. In the next step of processing, the Log object matches the event specifications to the activity log entries by calling on the MessageSpecification object. This processing is represented in FIG. 16 by the label "2: match (Message)" on the connecting line from the "log" object cloud to the "message specification" object cloud.

When a new log section is located, the Log object marks it as a beginning section by creating an appropriate (begin section) LogEvent object. This processing is indicated in FIG. 16 by the label "3: section_begin_action(LogEvent)" on the connecting line at the "log" object cloud that returns on itself. When an activity log entry that matches a LogEvent type is located, it is mapped onto the corresponding LogEvent object. This processing is indicated by the label "4: mark_event(LogEvent)" on the connecting line from the "log" object to the "current log section" object cloud. Finally, when the activity log input stream ends and a section end is encountered, the end is marked by creating an appropriate LogEvent object. This is indicated by the label "5: section_end_action(LogEvent)" on the "log" object connecting line that returns on itself.

Figure 17:
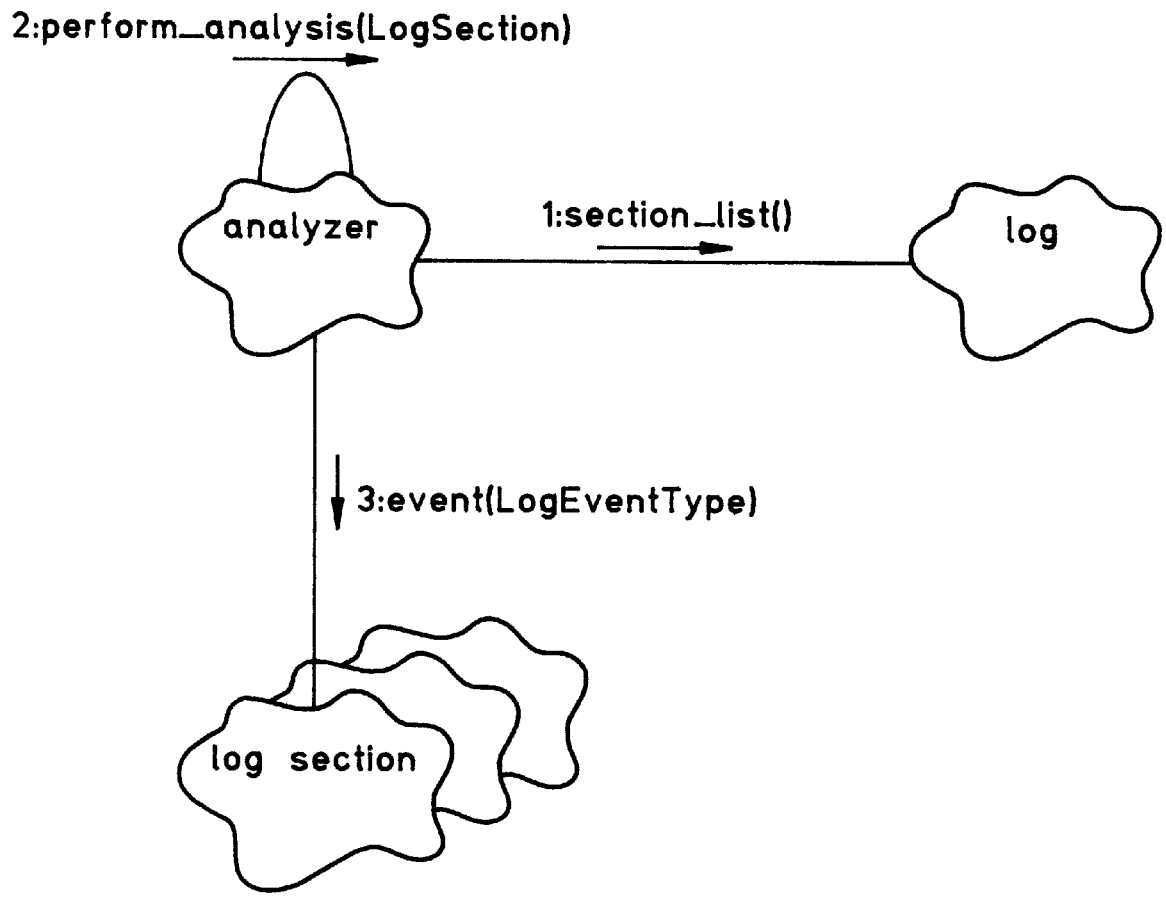
FIG. 17 is a scenario diagram representation of the processing steps executed by the host processor illustrated in FIG. 8 when analyzing LogSection objects of a Log object with an Analyzer.

After the Log object has been parsed into constituent LogEvent objects it can be analyzed by the Analyzer object. The analysis processing is shown in FIG. 17. FIG. 17 shows the analysis, section by section, of a Log object by an Analyzer object. The process begins with a call by the Analyzer object on a Log object, as indicated by the connecting line labelled "1: section list( )" from the "analyzer" object cloud to the "log" object cloud. This processing represents providing the LogSection objects to the Analyzer object, beginning with the first section and continuing through to the last LogSection. The label "2: perform_analysis(LogSection)" on the recursive connecting line from the "analyzer" object cloud back on itself indicates that the Analyzer object repeatedly calls for analysis on each LogSection object of the Log. For each LogSection object, the Analyzer object calls its analysis( ) operations on each LogEvent object in the LogSection. The analysis( ) operations match the LogEvent types to the appropriate computer system action. This is indicated by the label "3: event (LogEventType)" on the connecting line from the "analyzer" object cloud to the "log section" object cloud.

Figure 18:
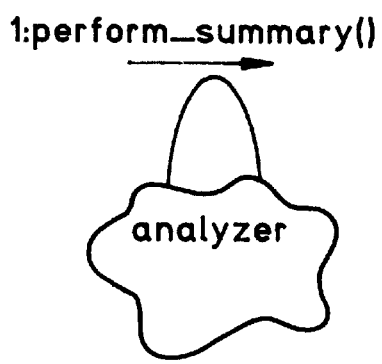
FIG. 18 is a scenario diagram representation of the processing steps executed by the host processor illustrated in FIG. 8 when a log analysis summary is performed.

FIG. 18 shows how the Analyzer object carries out the summary generation, by calling the perform_summary( ) operation on itself. This is indicated in FIG. 17 by the connecting line labelled "1: perform_summary( )" from the object cloud "analyzer" back on itself. The perform_summary( ) operation for a source file compiler log analysis tool, for example, would generate statistics that summarize the file directories that were compiled, the number of compile errors found by source file and directory, destination address of compiled code, and the like.

FIG. 19 is a scenario that shows how the analysis operation is performed for a log analysis involving composite, or chained, analyzers. The recursive connecting line from the "composite analyzer" object cloud back on itself with the legend "1: analyze(Log)" indicates that a CompositeAnalyzer object calls itself on a LogSection object. As noted above, a CompositeAnalyzer call involves calling each of the constituent Analyzer objects, so that multiple Analyzer objects can analyze a LogSection and thereby complete an analysis of a Log object on only a single traversal of the log. The connecting line from the object cloud "composite analyzer" to the object cloud "analyzer" with the arrow labelled "2: analyze(Log)" indicates that the CompositeAnalyzer object is calling the analyze( ) operation on the Analyzer objects of which it consists.

FIG. 20 shows the summarize action of the framework for a composite analyzer such as represented by the analyzer processing of FIG. 19. FIG. 20 is a scenario that shows how a summary operation is performed with a method call from the CompositeAnalyzer object on its constituent Analyzer objects, analogous to the analysis situation described for FIG. 19. The recursive connecting line from the "composite analyzer" object cloud back on itself with the legend "1: summarize( )" indicates that a CompositeAnalyzer object calls the summarize( ) operation on each of its constituent Analyzer objects repeatedly for the same LogSection object, so that multiple Analyzer objects can summarize the analysis on only a single traversal of the activity log. The connecting line from the object cloud "composite analyzer" to the object cloud "analyzer" with the arrow labelled "2: summarizes" indicates the call to each Analyzer object.

Figure 21:
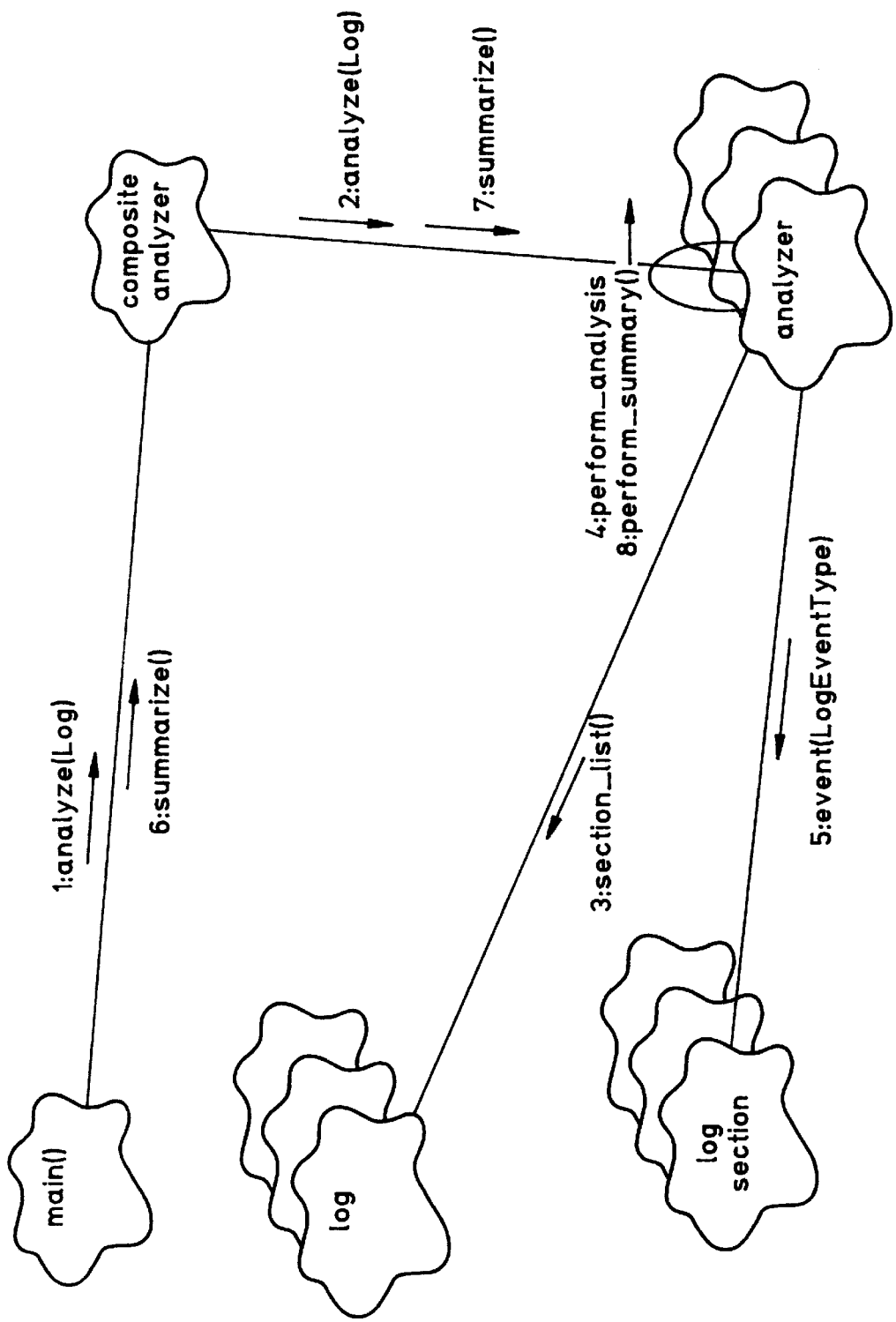
FIG. 21 is a scenario diagram representation of the processing steps executed by the host processor illustrated in FIG. 8 when analyzing LogSection objects of a Log object with a CompositeAnalyzer.

FIG. 21 shows the processing of an activity log from beginning to end. The processing was illustrated in the separate diagrams comprising FIGS. 15 through 20. Thus, the first step is for the user (shown as the "main" object cloud) to build a CompositeAnalyzer object. This is indicated by the connecting line labelled "1: analyze(Log)" on the connecting line from the "main( )" object cloud to the "composite analyzer" object cloud. When the Composite-Analyzer object has been built, the next step is for the CompositeAnalyzer to call each of the constituent Analyzer objects on the Log object. This is represented by the connecting line labelled "2: analyze(Log)" from the "composite analyzer" object cloud to the multiple "analyzer" clouds. Next, the Analyzer objects obtain a list of LogSection objects to be processed. This processing is represented by the connecting line labelled "3: section_list( ) " from the "analyzer" object clouds to the "log" object clouds. The performance of the analysis by each Analyzer object on the objects of the Log class is represented by the connecting line labelled "4: perform_analysis( )" at the group of "analyzer" object clouds back on themselves. The identification of LogEvent types from the analysis is indicated by the connecting line from the "analyzer" object clouds to the "log section" object clouds labelled "5: event(LogEventType)".

After the LogEvent objects have been analyzed, the user initiates the analysis summary. This is represented in FIG. 21 by the label "6: summarize( )" on the connecting line from the "main( )" object cloud to the "composite analyzer" object cloud. As with the analyze operation, the next step is for the CompositeAnalyzer to call the summarize operation of its constituent Analyzer objects. This processing is represented by the label "7: summarize( )" on the connecting line from the "composite analyzer" object cloud to the group of "analyzer" object clouds. Finally, the summary operations of the individual Analyzer objects is indicated by the label "8: perform_summary( )" on the connecting line that leads back onto the group of "analyzer" object clouds.

Figure 22:
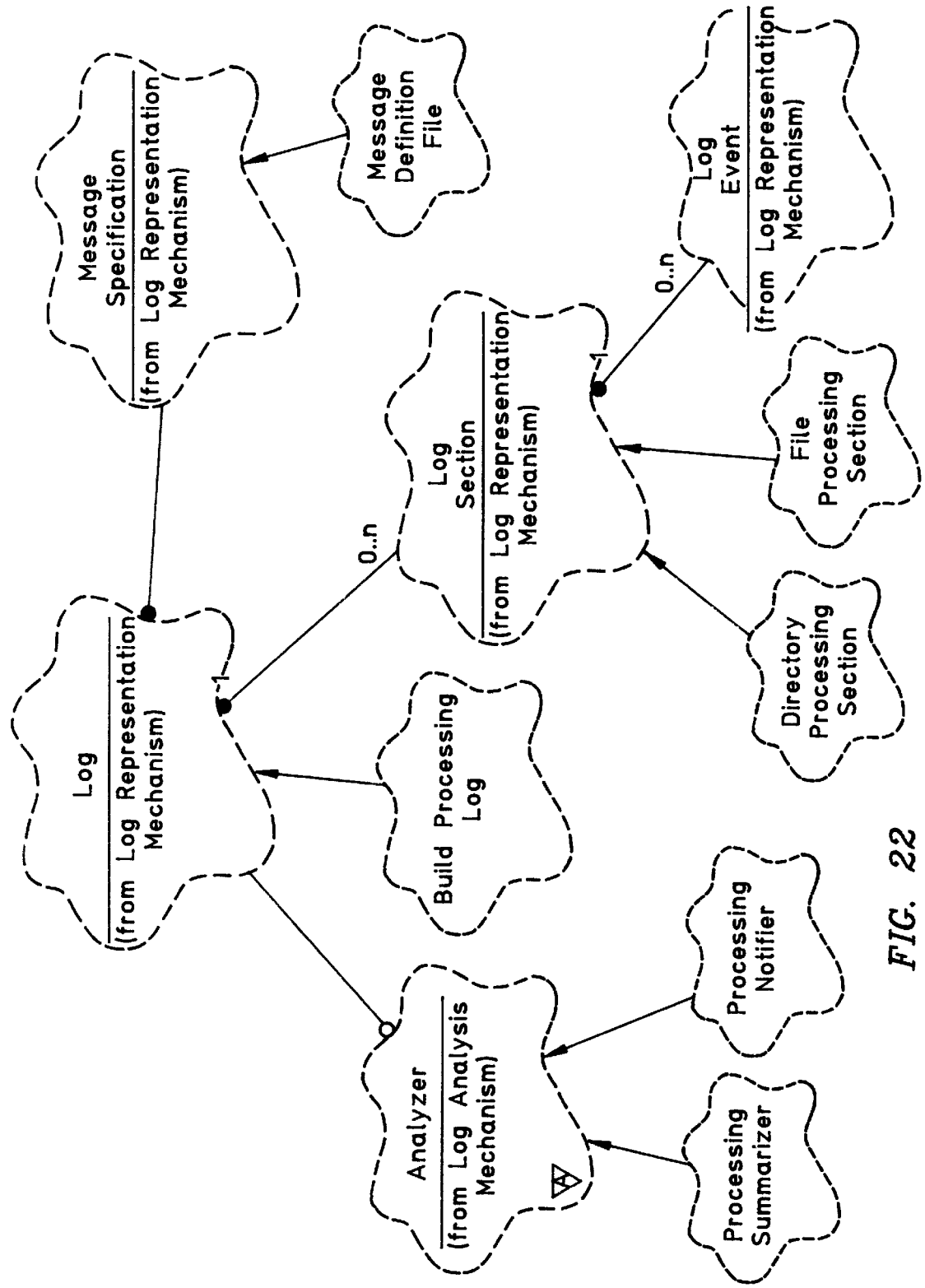
FIG. 22 is a class diagram representation of the Log and Analyzer object structure in a software build analysis tool extension of the framework in accordance with the present invention.

The value of using a framework to encapsulate a design comes from the potential to extend the design and share it among different applications. Examples of possible extensions to the framework object classes illustrate the diverse type of log analysis tools that can be customized by simply extending the attributes of the framework. FIG. 22 shows object classes for a log analysis tool for use with a log created from a software build process. Large software build processors execute compile or build processes on source code programs and generate large amounts of log output. For example, every source code program must be identified as to location, version, compilation parameters and options, destination, linking, and the like. All of this information can be contained in the process log created by the processor. In addition, the results of all the build processing are contained in the log, including confirmation of the processes, error messages, diagnostic information, and the like. Those skilled in the art will appreciate the volume of information potentially generated by the build process.

It is useful to summarize the output of the process log generated by the build process for quick reference to the process outcome, debugging, and maintenance. It also would be useful to have automatic notification to software developers who have responsibility for seeing to build-time errors, failures, and other problems. Automatic notification would eliminate having to determine the persons to be notified, determining their location, and providing the notification. Such processing can be constructed as part of the framework extension by specifying the appropriate attributes and behaviors for the extension, as described above. FIG. 22 illustrates one such extension.

FIG. 22 shows the Log object with, as before, a "using" relationship with an Analyzer object and a "contains" relationship with a MessageSpecification object and from zero to n LogSection objects. Extensions to the framework are indicated by the inheritance relationships in the drawing figure. For example, the BuildProcessingLog object that inherits attributes and behavior from the Log object will define a BuildProcessingLog type of Log object that contains the type of information produced by the build processor whose output will be analyzed. The MessageDefinitionFile object that inherits from the MessageSpecification object will be responsible for parsing the build process log onto the appropriate BuildProcessingLog objects. That is, the MessageDefinitionFile object is a MessageSpecification object that reads a definition file to decide what messages from the build process output log should be mapped to LogEvent objects. This permits the framework user to define meanings of important messages in a flat file or table, which eliminates the need for code modification. In the FIG. 22 example, the file contains messages that indicate failed compile operations, file systems retries, references to files no found, and the like.

The LogSection objects contained in the BuildProcessingLog will include, among others, a DirectoryProcessingSection object and a FileProcessingSection object. These two types of objects inherit their structure from the LogSection object. Thus, the framework implementer in the FIG. 22 example has determined that two types of log sections created by the build processor will be referred to as the result of directory processing and the result of file processing, respectively. As before, the LogSection object is in a "contains" relationship with multiple LogEvent objects.

Finally, the ProcessingSummarizer object and ProcessingNotifier objects that inherit from the Analyzer object carry out the post-log analysis summary report and automatic notification decided upon by the framework implementer, as described. In particular, a ProcessingSummarizer object is an Analyzer object that keeps track of statistics based on the LogSection objects contained in the BuildProcessingLog object and generates output for quick reference by the software builder, while the ProcessingNotifier object is an Analyzer object that checks every DirectoryProcessingSection object and FileProcessingSection object contained in a the BuildProcessingLog object and automatically notifies the software developer who is responsible for handling a particular software build failure. The framework permits the ProcessingSummarizer object and the ProcessingNotifier object to be combined into one CompositeAnalyzer object, which can advantageously perform build processing log analysis with only one traversal of the build processing Log object.

The instantiation of the processing log analysis tool framework extension exemplified by FIG. 22 can be illustrated in the following sample C programming language code (with explanatory comments) in Table 2:

TABLE 2

Sample main() operation.

```
int main (int argc, char *argv[])
{
    //Instantiate the customized MessageSpecification object.
    MessageDefinitionFile messageSpec (messageDefinitionFilename);
    //Instantiate the customized Log object.
    BuildProcessingLog log (logFilename, messageSpec);
    //Instantiate the different types of customized analyzer objects to be used.
    ProcessingSummarizer summarizer (outputFilename);
    ProcessingNotifier notifier;
    //Instantiate the composite analyzer.
    CompositeAnalyzer cAnalyzer;
    cAnalyzer.add (summarizer);
    cAnalyzer.add (notifier);
    //Analyze the Log.
    cAnalyzer.analyze (log);
    //Summarize the Log.
    cAnalyzer.summarize();
}
```

Figure 23:
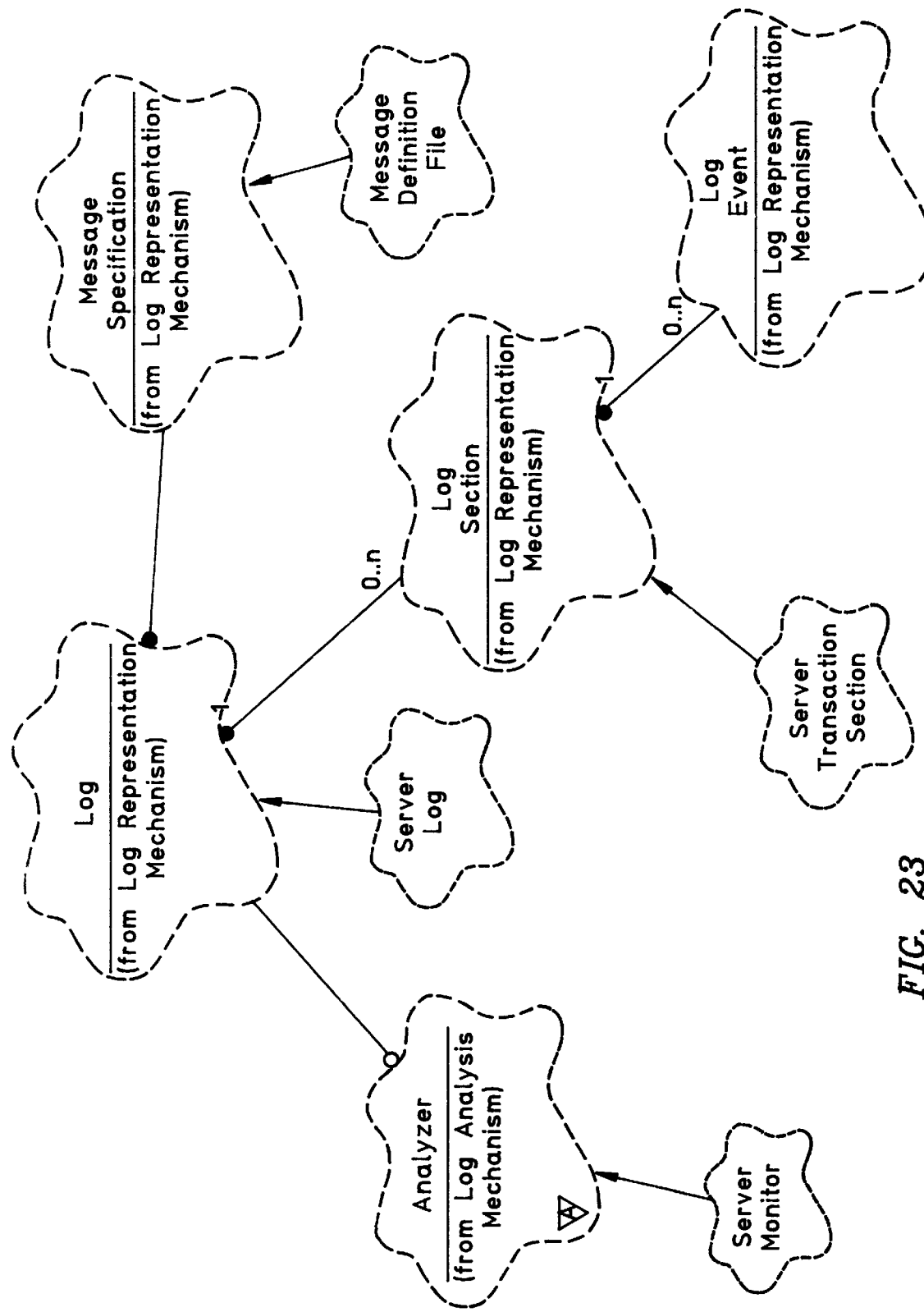
FIG. 23 is a class diagram representation of the Log and Analyzer object structure in a file server log analysis tool extension of the framework in accordance with the present invention.

Another example of advantageous extension of the framework is that of file server operations and the server activity logs created. Most server jobs are created with the intention of eliminating the need for a human to constantly monitor the behavior of the server. This is often automated using so-called "watchdog" programs that read the output created by a server job and notify a human operator only when a server error occurs. An activity log analysis tool can be constructed as an extension to the framework described above. FIG. 23 illustrates such an extension.

FIG. 23 shows the Log object with, as usual, a "using" relationship with an Analyzer object and a "contains" relationship with a MessageSpecification object and from zero to n LogSection objects. Again, extensions to the framework are indicated by the inheritance relationships in the drawing figure. Thus, the ServerLog object inherits attributes and behavior from the Log object and will define a ServerLog type of Log object that contains the information produced by a file server. The MessageDefinitionFile object that inherits from the MessageSpecification object will be responsible for parsing the server activity log onto the appropriate ServerLog objects. That is, the MessageDefinitionFile object is a MessageSpecification object that reads a definition file to decide what messages from the file server activity log should be mapped to LogEvent objects. This permits the framework user to define meanings of important messages in a flat file or table, which eliminates the need for code modification. In the FIG. 23 example, the file contains server messages that indicate server transactions, including whether operations were successful or failed.

The LogSection objects contained in the ServerLog will include, in the FIG. 23 example, ServerTransactionSection types of objects. This object type inherits its structure from the LogSection class. As before, the LogSection object is in a "contains" relationship with multiple LogEvent objects. The ServerMonitor object that inherits from the Analyzer class carries out the post-log analysis summary report and automatic notification operations decided upon by the framework implementer. In particular, a ServerMonitor object is an Analyzer object that checks every ServerTransactionSection object contained in the given ServerLog object and automatically sends a signal to the person responsible for the server operation. As with the prior example, the ServerMonitor type of Analyzer object can be combined with other Analyzer objects into one CompositeAnalyzer object to perform build processing log analysis with only one traversal of the Log object.

Figure 24:
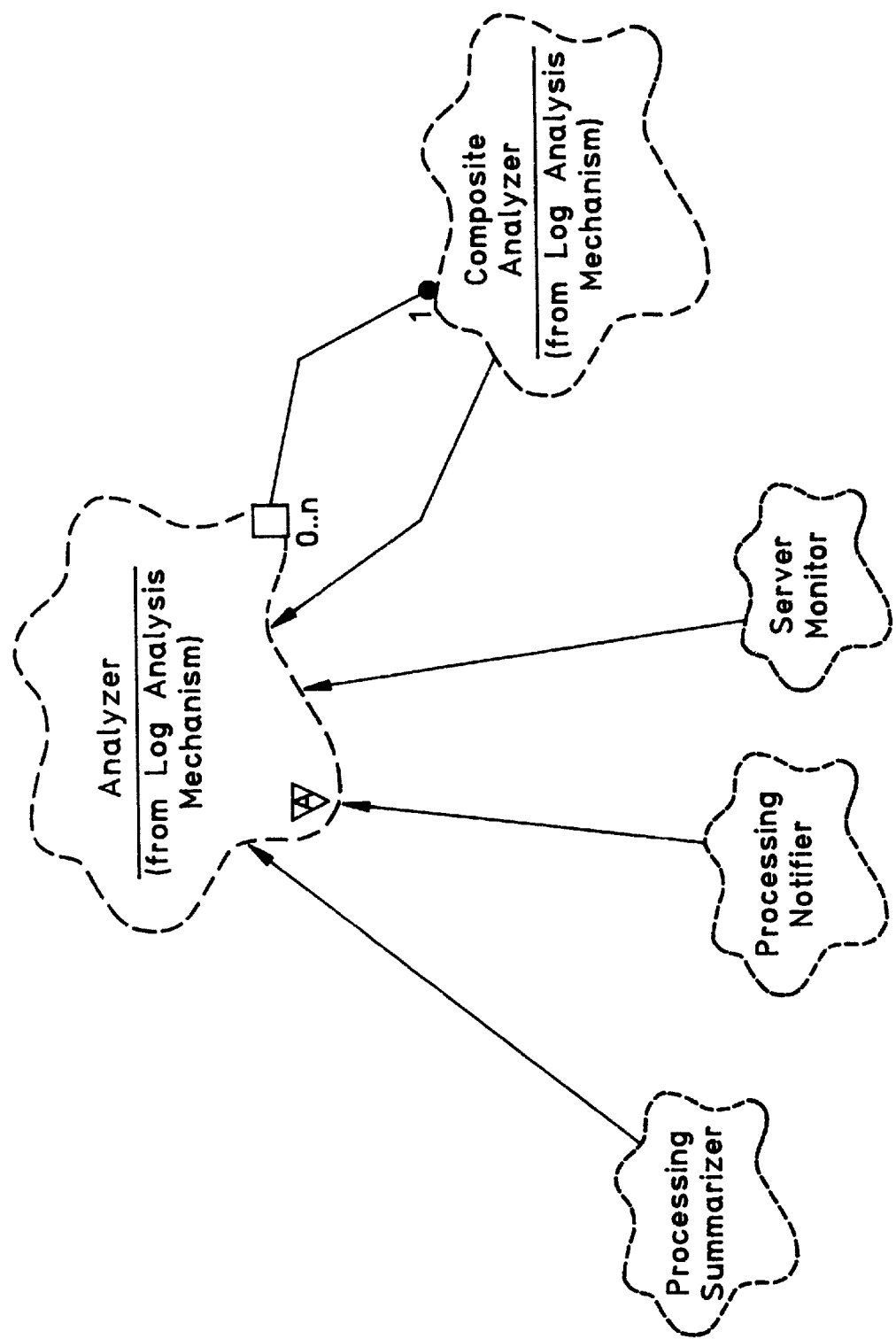
FIG. 24 is a class diagram representation of the Analyzer and CompositeAnalyzer object structure in a log analysis tool that permits dual log analysis of the build processing log illustrated in FIG. 21 and the file server activity log illustrated in FIG. 22.

As noted above, dissimilar Analyzer objects can be chained together in a single CompositeAnalyzer object so that an activity log that has been mapped onto a Log object can be analyzed in a single processing traversal. FIG. 24 illustrates a CompositeAnalyzer object that chains together Analyzer objects comprising the ProcessingSummarizer and ProcessingNotifier objects illustrated in FIG. 22 and the ServerMonitor object illustrated in FIG. 23. Thus, FIG. 24 shows that the ProcessingSummarizer, ProcessingNotifier, and ServerMonitor all inherit from the Analyzer object class, and therefore the CompositeAnalyzer object also inherits from the Analyzer. The "contains" relationship indicated for CompositeAnalyzer with Analyzer indicates that CompositeAnalyzer chains the different types of Analyzer objects together. The operation of the CompositeAnalyzer object should be understood in view of the drawings and description above.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2d ed. (1994), available from The Benjamin/Cummings Publishing Company, Inc., Redwood City, Calif., U.S.A. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are sometimes separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

I claim:

1. A computer system comprising:
    a central processing unit;
    a user interface; and
    a main memory having an operating system that supports an object-oriented programming environment containing a framework that provides an extensible log analysis tool system that receives a processing log having log entries, maps the log entries onto an object inheritance structure, analyzes the log entries, and produces a summary report of the analysis.

2. A computer system as defined in claim 1, wherein the framework defines an object oriented programming log class comprising a class of log sections that each include a set of log event objects corresponding to the log entries, an analyzer class having analyzer objects, and a plurality of object methods including a set of operations that are used by the log class to map the log entries onto the object inheritance structure, and a set of operations that are used by the analyzer objects to analyze the log event objects and produce the summary report.

3. A computer system as defined in claim 2, wherein the framework further defines a message specification class of objects that match the log entries with corresponding log event objects.

4. A computer system as defined in claim 3, wherein each of the objects in the message specification class parse the log entries into log event objects according to a different log class type.

5. A computer system as defined in claim 4, wherein the log class object passes each log entry to one of the message specification objects for matching with corresponding log event objects.

6. A computer system as defined in claim 3, wherein a message specification object creates log event objects that correspond to a beginning log section log entry.

7. A computer system as defined in claim 3, wherein a message specification object creates log event objects that correspond to an ending log section log entry.

8. A computer system as defined in claim 3, wherein the object operations include message specification operations that create a log event object in response to matching a log entry to a log event object type according to a log class object in which the message specification operation is contained.

9. A computer system as defined in claim 3, wherein the object operations include message specification operations that create a log event object that indicates an error entry was encountered in the processing log.

10. A computer system as defined in claim 2, wherein the object methods include operations that automatically perform a system action to provide notification of a condition requiring response.

11. A computer system as defined in claim 2, wherein the object methods include operations that create a beginning of log section log event object.

12. A computer system as defined in claim 2, wherein the object methods include operations that create an ending of log section log event object.

13. A computer system as defined in claim 2, wherein the framework further defines a composite analyzer class of objects that chain together more than one analyzer object.

14. A computer system as defined in claim 13, wherein each analyzer object performs analysis operations on a different type of log object.

15. A computer system as defined in claim 13, wherein the object methods include analysis operations such that each type of analyzer object includes analysis operations that perform analysis on the log event objects.

16. A computer system as defined in claim 15, wherein the object methods further include analysis operations such that the analysis operations of each type of analyzer object perform analysis by matching a log event object to a predetermined one of log event object types.

17. A computer system as defined in claim 13, wherein each analyzer object produces a summary of the analysis operation results of the analysis operations it contains.

18. A computer system as defined in claim 2, wherein the object methods include analysis operations that perform analysis on log event objects.

19. A computer system as defined in claim 18, wherein the analysis operations perform analysis by matching a log event object to a predetermined one of log event object types.

20. A computer system as defined in claim 2, wherein the object methods include summary operations that produce a summary of the analysis operation results.

21. An apparatus comprising:
   a central processing unit;
   a memory coupled to the central processing unit; and
   an object oriented framework residing in the memory, the object oriented framework defining an object oriented programming log class comprising a class of log sections that each include a set of log event objects corresponding to the log entries, an analyzer class having analyzer objects, and a plurality of object methods including a set of operations that are used by the log class to map the log entries onto the object inheritance structure, and a set of operations that are used by the analyzer objects to analyze the log event objects and produce the summary report.

22. An object oriented framework as defined in claim 21, wherein the framework further defines a message specification class of objects that match the log entries with corresponding log event objects.

23. An object oriented framework as defined in claim 22, wherein each of the objects in the message specification class parse the log entries into log event objects according to a different log class type.

24. An object oriented framework as defined in claim 23, wherein the log class object passes each log entry to one of the message specification objects for matching with corresponding log event objects.

25. An object oriented framework as defined in claim 22, wherein a message specification object creates log event objects that correspond to a beginning log section log entry.

26. An object oriented framework as defined in claim 22, wherein a message specification object creates log event objects that correspond to an ending log section log entry.

27. An object oriented framework as defined in claim 22, wherein the object operations include message specification operations that create a log event object in response to matching a log entry to a log event object type according to a log class object in which the message specification operation is contained.

28. An object oriented framework as defined in claim 22, wherein the object operations include message specification operations that create a log event object that indicates an error entry was encountered in the processing log.

29. An object oriented framework as defined in claim 21, wherein the object methods include operations that automatically perform a system action to provide notification of a condition requiring response.

30. An object oriented framework as defined in claim 21, wherein the object methods include operations that create a beginning of log section log event object.

31. An object oriented framework as defined in claim 21, wherein the object methods include operations that create an ending of log section log event object.

32. An object oriented framework as defined in claim 21, wherein the framework further defines a composite analyzer class of objects that chain together more than one analyzer object.

33. An object oriented framework as defined in claim 32, wherein each analyzer object performs analysis operations on a different type of log object.

34. An object oriented framework as defined in claim 32, wherein the object methods include analysis operations such that each type of analyzer object includes analysis operations that perform analysis on the log event objects.

35. An object oriented framework as defined in claim 34, wherein the object methods further include analysis operations such that the analysis operations of each type of analyzer object perform analysis by matching a log event object to a predetermined one of log event object types.

36. An object oriented framework as defined in claim 32, wherein each analyzer object produces a summary of the analysis operation results of the analysis operations it contains.

37. An object oriented framework as defined in claim 21, wherein the object methods include analysis operations that perform analysis on log event objects.

38. An object oriented framework as defined in claim 37, wherein the analysis operations perform analysis by matching a log event object to a predetermined one of log event object types.

39. An object oriented framework as defined in claim 21, wherein the object methods include summary operations that produce a summary of the analysis operation results.

40. A program product for use in a computer system having an operating system that supports an object-oriented programming environment, the program product comprising:
   a computer-recordable media; and
   a framework recorded on the computer-recordable media, the framework providing an extensible log analysis tool system that receives a processing log having log entries, maps the log entries onto an object inheritance structure, analyzes the log entries, and produces a summary report of the analysis.

41. A program product as defined in claim 40, wherein the framework defines an object oriented programming log class comprising a class of log sections that each include a set of log event objects corresponding to the log entries, an analyzer class having analyzer objects, and a plurality of object methods including a set of operations that are used by the log class to map the log entries onto the object inheritance structure, and a set of operations that are used by the analyzer objects to analyze the log event objects and produce the summary report.

42. A program product as defined in claim 41, wherein the framework further defines a message specification class of objects that match the log entries with corresponding log event objects.

43. A program product as defined in claim 42, wherein each of the objects in the message specification class parse the log entries into log event objects according to a different log class type.

44. A program product as defined in claim 43, wherein the log class object passes each log entry to one of the message specification objects for matching with corresponding log event objects.

45. A program product as defined in claim 42, wherein a message specification object creates log event objects that correspond to a beginning log section log entry.

46. A program product as defined in claim 42, wherein a message specification object creates log event objects that correspond to an ending log section log entry.

47. A program product as defined in claim 42, wherein the object operations include message specification operations that create a log event object in response to matching a log entry to a log event object type according to a log class object in which the message specification operation is contained.

48. A program product as defined in claim 42, wherein the object operations include message specification operations that create a log event object that indicates an error entry was encountered in the processing log.

49. A program product as defined in claim 41, wherein the object methods include operations that automatically perform a system action to provide notification of a condition requiring response.

50. A program product as defined in claim 41, wherein the object methods include operations that create a beginning of log section log event object.

51. A program product as defined in claim 41, wherein the object methods include operations that create an ending of log section log event object.

52. A program product as defined in claim 41, wherein the framework further defines a composite analyzer class of objects that chain together more than one analyzer object.

53. A program product as defined in claim 52, wherein each analyzer object performs analysis operations on a different type of log object.

54. A program product as defined in claim 52, wherein the object methods include analysis operations such that each type of analyzer object includes analysis operations that perform analysis on the log event objects.

55. A program product as defined in claim 54, wherein the object methods further include analysis operations such that the analysis operations of each type of analyzer object perform analysis by matching a log event object to a predetermined one of log event object types.

56. A program product as defined in claim 52, wherein each analyzer object produces a summary of the analysis operation results of the analysis operations it contains.

57. A program product as defined in claim 41, wherein the object methods include analysis operations that perform analysis on log event objects.

58. A program product as defined in claim 57, wherein the analysis operations perform analysis by matching a log event object to a predetermined one of log event object types.

59. A program product as defined in claim 41, wherein the object methods include summary operations that produce a summary of the analysis operation results.

60. A program product comprising:
   a computer-readable transmission media; and
   a framework transmitted on the computer-readable transmission media, the framework providing an extensible log analysis tool system that receives a processing log having log entries, maps the log entries onto an object inheritance structure, analyzes the log entries, and produces a summary report of the analysis.

61. The program product of claim 60, wherein the framework defines an object oriented programming log class comprising a class of log sections that each include a set of log event objects corresponding to the log entries, an analyzer class having analyzer objects, a set of operations that are used by the log class to map the log entries onto the object inheritance structure, and a set of operations that are used by the analyzer objects to analyze the log event objects and produce the summary report.

62. The program product of claim 61, wherein the framework further defines a message specification class of objects that match the log entries with corresponding log event objects.

63. The program product of claim 62, wherein each of the objects in the message specification class parse the log entries into log event objects according to a different log class type.

64. The program product of claim 63, wherein the log class object passes each log entry to one of the message specification objects for matching with corresponding log event objects.

65. The program product of claim 62, wherein a message specification object creates log event objects that correspond to a beginning log section log entry.

66. The program product of claim 62, wherein a message specification object creates log event objects that correspond to an ending log section log entry.

67. The program product of claim 62, wherein the object operations include message specification operations that create a log event object in response to matching a log entry to a log event object type according to a log class object in which the message specification operation is contained.

68. The program product of claim 62, wherein the object operations include message specification operations that create a log event object that indicates an error entry was encountered in the processing log.

69. The program product of claim 61, wherein the object methods include operations that automatically perform a system action to provide notification of a condition requiring response.

70. The program product of claim 61, wherein the object methods include operations that create a beginning of log section log event object.

71. The program product of claim 61, wherein the object methods include operations that create an ending of log section log event object.

72. The program product of claim 61, wherein the framework further defines a composite analyzer class of objects that chain together more than one analyzer object.

73. The program product of claim 72, wherein each analyzer object performs analysis operations on a different type of log object.

74. The program product of claim 72, wherein the object methods include analysis operations such that each type of analyzer object includes analysis operations that perform analysis on log event objects for the corresponding log class type.

75. The program product of claim 74, wherein the object methods further include analysis operations such that the analysis operations of each type of analyzer object perform analysis by matching a log event object to a predetermined one of log event object types for the corresponding log class type.

76. The program product of claim 72, wherein each analyzer object produces a summary of the analysis operation results of the analysis operations it contains.

77. The program product of claim 61, wherein the object methods include analysis operations that perform analysis on log event objects.

78. The program product of claim 77, wherein the analysis operations perform analysis by matching a log event object to a predetermined one of log event object types.

79. The program product of claim 61, wherein the object methods include summary operations that produce a summary of the analysis operation results.

80. A method of providing a log analysis tool, the method comprising the steps of:
   providing an object oriented framework that provides an extensible log analysis tool system that receives a processing log having log entries, maps the log entries onto an object inheritance structure, analyzes the log entries, and produces a summary report of the analysis; and
   executing the object oriented framework on an apparatus.

81. A method as defined in claim 80, wherein the provided framework defines an object oriented programming log class comprising a class of log sections that each include a set of log event objects corresponding to the log entries, an analyzer class having analyzer objects, and a plurality of object methods including a set of operations that are used by the log class to map the log entries onto the object inheritance structure, and a set of operations that are used by the analyzer objects to analyze the log event objects and produce the summary report.

82. A method as defined in claim 81, wherein the framework further defines a message specification class of objects that match the log entries with corresponding log event objects.

83. A method as defined in claim 82, wherein each of the objects in the message specification class parse the log entries into log event objects according to a different log class type.

84. A method as defined in claim 83, wherein the log class object passes each log entry to one of the message specification objects for matching with corresponding log event objects.

85. A method as defined in claim 82, wherein a message specification object creates log event objects that correspond to a beginning log section log entry.

86. A method as defined in claim 82, wherein a message specification object creates log event objects that correspond to an ending log section log entry.

87. A method as defined in claim 82, wherein the object operations include message specification operations that create a log event object in response to matching a log entry to a log event object type according to a log class object in which the message specification operation is contained.

88. A method as defined in claim 82, wherein the object operations include message specification operations that create a log event object that indicates an error entry was encountered in the processing log.

89. A method as defined in claim 81, wherein the object methods include operations that automatically perform a system action to provide notification of a condition requiring response.

90. A method as defined in claim 81, wherein the object methods include operations that create a beginning of log section log event object.

91. A method as defined in claim 81, wherein the object methods include operations that create an ending of log section log event object.

92. A method as defined in claim 81, wherein the framework further defines a composite analyzer class of objects that chain together more than one analyzer object.

93. A method as defined in claim 92, wherein each analyzer object performs analysis operations on a different type of log object.

94. A method as defined in claim 92, wherein the object methods include analysis operations such that each type of analyzer object includes analysis operations that perform analysis on the log event objects.

95. A method as defined in claim 94, wherein the object methods further include analysis operations such that the analysis operations of each type of analyzer object perform analysis by matching a log event object to a predetermined one of log event object types.

96. A method as defined in claim 92, wherein each analyzer object produces a summary of the analysis operation results of the analysis operations it contains.

97. A method as defined in claim 81, wherein the object methods include analysis operations that perform analysis on log event objects.

98. A method as defined in claim 97, wherein the analysis operations perform analysis by matching a log event object to a predetermined one of log event object types.

99. A method as defined in claim 81, wherein the object methods include summary operations that produce a summary of the analysis operation results.

* * * * *